US012619959B2

(12) United States Patent
Nakamura

(10) Patent No.: US 12,619,959 B2
(45) Date of Patent: May 5, 2026

(54) DATA STRUCTURE, TRANSMISSION DEVICE, RECEIVING DEVICE, SETTLEMENT DEVICE, METHOD, AND COMPUTER PROGRAM

(71) Applicant: NTI, Inc., Yokkaichi (JP)

(72) Inventor: Takatoshi Nakamura, Tokyo (JP)

(73) Assignee: NTI, INC., Mie (JP)

( * ) Notice: Subject to any disclaimer, the term of this patent is extended or adjusted under 35 U.S.C. 154(b) by 0 days.

(21) Appl. No.: 18/650,767

(22) Filed: Apr. 30, 2024

(65) Prior Publication Data

US 2024/0303613 A1     Sep. 12, 2024

Related U.S. Application Data

(62) Division of application No. 16/613,229, filed as application No. PCT/JP2018/019030 on May 17, 2018, now Pat. No. 12,002,019.

(30) Foreign Application Priority Data

May 17, 2017     (JP) .................................. 2017098099

(51) Int. Cl.
G06Q 20/06          (2012.01)

(52) U.S. Cl.
CPC ....... G06Q 20/065 (2013.01); G06Q 2220/00 (2013.01)

(58) Field of Classification Search
CPC .. G06Q 20/065; G06Q 2220/00; G06Q 20/06; H04L 9/0656; H04L 9/0861; H04L 9/12; H04L 9/50
See application file for complete search history.

(56) References Cited

U.S. PATENT DOCUMENTS 10,140,658 B1     11/2018   Bagherzadeh
11,055,710 B2 *    7/2021   Wang ..................... G06Q 40/04
            (Continued)

FOREIGN PATENT DOCUMENTS

JP        2002123771 A      4/2002
JP        2003335085 A      11/2003
            (Continued)

OTHER PUBLICATIONS

"Blockchain Exhumed", Dhiren Patel, IEEE Xplore, Feb. 1, 2017 (Year: 2017).*
            (Continued)

*Primary Examiner* — Duan Zhang
(74) *Attorney, Agent, or Firm* — Edell, Shapiro & Finnan, LLC

(57)          ABSTRACT

Provided is a data structure of virtual currency data with high safety. The virtual currency data, which is used in combination with a settlement device that accepts settlement when the virtual currency data is received from a predetermined device via a network and when predetermined conditions are satisfied, includes virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency.

3 Claims, 17 Drawing Sheets

(56) References Cited

U.S. PATENT DOCUMENTS

| 2003/0007635 | A1* | 1/2003 | Li | ........................... H04L 9/001 |
| | | | | 380/28 |
| 2017/0293899 | A1* | 10/2017 | Furche | ................. H04L 9/3213 |
| 2018/0040040 | A1* | 2/2018 | Barski | ....................... H04L 9/50 |

FOREIGN PATENT DOCUMENTS

| JP | 2010186417 | A | * | 8/2010 |
| JP | 2015225370 | A | | 12/2015 |
| JP | 2015228167 | A | | 12/2015 |

OTHER PUBLICATIONS

International Search Report, PCT/JP2018/019030, Sep. 25, 2019, 3 pages.

* cited by examiner (A)

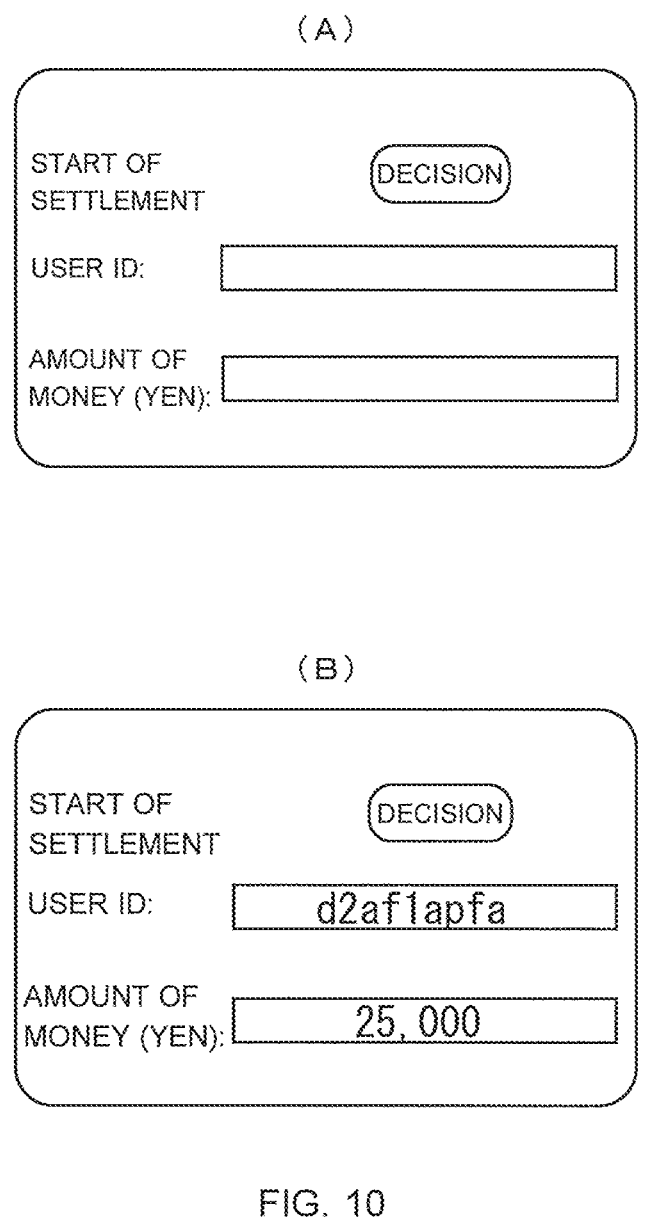

START OF
SETTLEMENT                    DECISION

USER ID:

AMOUNT OF
MONEY (YEN):

(B)

START OF
SETTLEMENT                    DECISION

USER ID:              d2af1apfa

AMOUNT OF
MONEY (YEN):          25,000

FIG. 10

| SETTLEMENT TERMINAL ID | POSITION INFORMATION | | ATTRIBUTE INFORMATION | |
|---|---|---|---|---|
| a i d a k 1 | 36° 18' 48.3"N | 139° 21' 17.5"E | A GROUP | ○○ MALL |
| 3 d i a L a 2 | 48° 34' 25.3"N | 13° 24' 56.8"E | B GROUP | |
| 5 3 K a k a p | 40° 44' 33.2"N | 73° 59' 36.1"W | | × × MALL |
| d a 6 d a 9 4 | 41° 50' 36.3"N | 70° 49' 26.1"W | | |
| o r z 5 5 6 1 | 33° 56' 41.4"S | 151° 14' 46.7"E | B GROUP | × × MALL |
| . . . . . | . . . . . | | . . . . . | |
| n m v 0 0 0 | 41° 24' 14.2"N | 2° 11' 09.1"E | B GROUP | |
| 9 9 j q n z | 22° 54' 37.7"S | 43° 14' 27.6"W | | ○○ MALL |

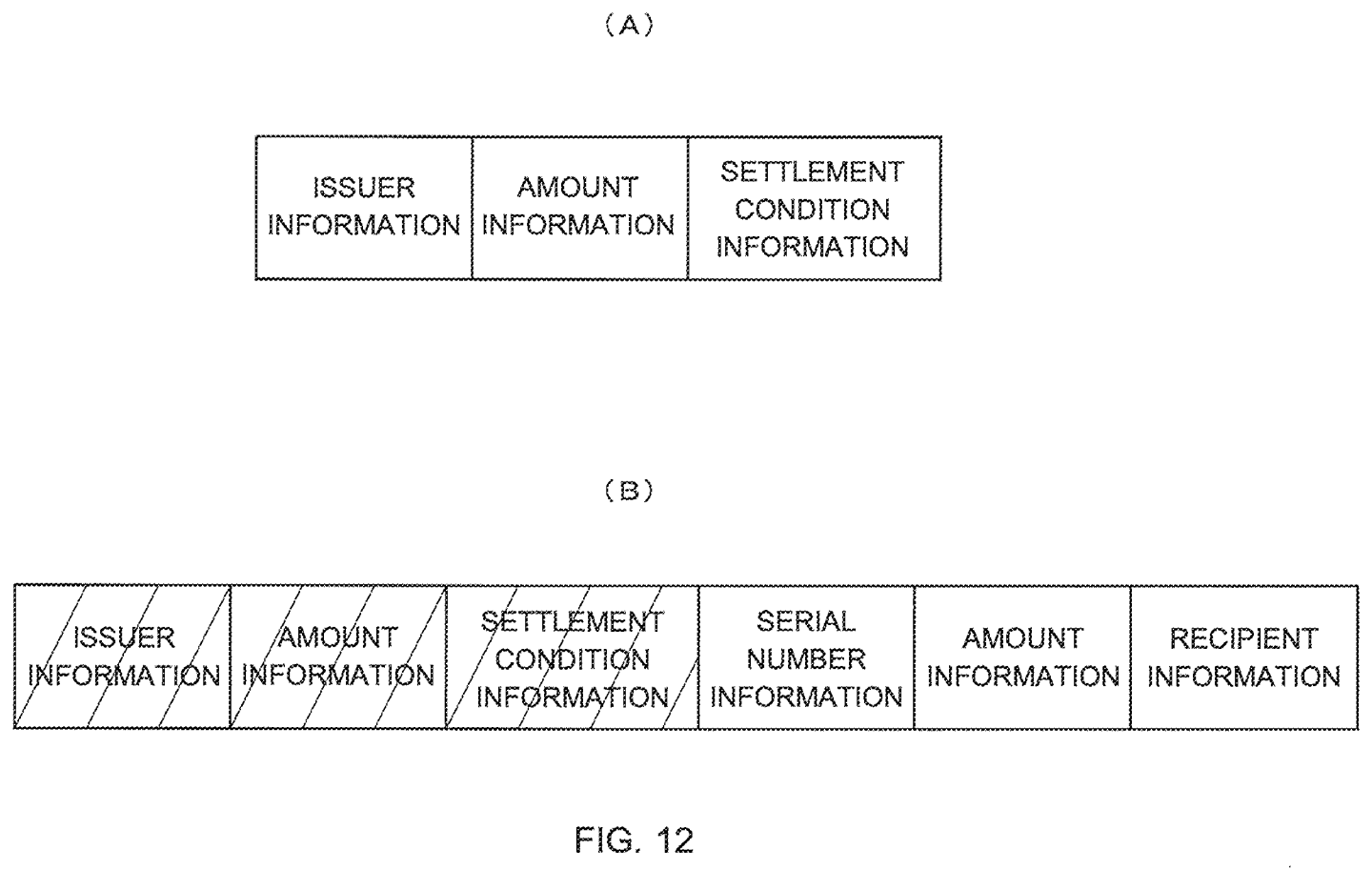

| ISSUER INFORMATION | AMOUNT INFORMATION | SETTLEMENT CONDITION INFORMATION |
|---|---|---|

(B)

| ISSUER INFORMATION | AMOUNT INFORMATION | SETTLEMENT CONDITION INFORMATION | SERIAL NUMBER INFORMATION | AMOUNT INFORMATION | RECIPIENT INFORMATION |
|---|---|---|---|---|---|

FIG. 12

DATA STRUCTURE, TRANSMISSION DEVICE, RECEIVING DEVICE, SETTLEMENT DEVICE, METHOD, AND COMPUTER PROGRAM

This application is a divisional of U.S. Application Ser. No. 16/613,229, filed Apr. 22, 2020, which is a § 371 National Stage Application of PCT/JP2018/019030, filed May 17, 2018, which claims priority to JP 2017098099, filed May 17, 2017, the entireties of which are incorporated herein by reference.

TECHNICAL FIELD

The present invention relates to a virtual currency (virtual cash).

BACKGROUND ART

In recent years, various proposals related to FinTech have been made, and some of the proposals have already been put into practical use.

Some of the proposals are called virtual currency. For example, Bitcoin (trademark), which began with a thesis published by someone using the name Satoshi Nakamoto and is realized by a system constructed on the Internet, is also generally called a virtual currency. On the other hand, bitcoin is sometimes referred to as cryptocurrency or crypto cash.

First, a structure of bitcoin will be described. Bitcoin is generally established by the following structure.

First, bitcoin is generated as follows.

A person who has the right to generate bitcoins is limited to an administrator who manages nodes to be described below. The node administrator participates in a certain game played on the Internet. The game is repeated, and the node administrator, who has won the game, can obtain a predetermined number of bitcoins every time the administrator wins the game.

The bitcoins generated in this way are transferred to a third party including a person other than the node administrator from the node administrator who obtains the bitcoins, for example, for "payment" in the same manner as general currency, and will be distributed as a result.

By the way, how to prevent double transfer is very important problem in the field of virtual currency or virtual money without being limited to bitcoin. Since general money, which is a tangible object, disappears from the transferor's hands when transferred from the transferor to the transferee, after the transferor transfers the money to the transferee, it is not possible for the transfer to transfer the same money to another transferee in principle. However, since the virtual currency is easy to duplicate and it is possible that the virtual currency as data owned by the transferor is not extinguished even when the transferor transfers the virtual currency to the transferee, it is very easy to transfer the same virtual currency to many people. Unless the same virtual currency can be prevented from being transferred to many people, such virtual currency cannot gain any trust as currency.

Bitcoin intends to solve such a problem of double transfer through a method of preserving all transaction records. The transaction records are as follows, for example. For simplicity, it is assumed that only four persons A to D participate in the structure of bitcoin and the node administrators are only two persons A and B. Assuming that the node administrator A wins the above-described game and gains 1,000 bitcoins, and the node administrator B wins the above-described game and gains 500 bitcoins.

In this state, A to D respectively have bitcoins described as follows.

TABLE 1

| | |
|---|---|
| A | +1000 |
| B | +500 |
| C | 0 |
| D | 0 |

Next, assuming that A has paid 100 bitcoins to C and B has paid 200 bitcoins to D.

In this state, A to D respectively have bitcoins described as follows.

TABLE 2

| | | |
|---|---|---|
| A | +1000 | −100 (to C) |
| B | +500 | −200 (to D) |
| C | 0 | +100 (from A) |
| D | 0 | +200 (from B) |

Next, assuming that A has paid 300 bitcoins to B and D has paid 100 bitcoins to C.

In this state, A to D respectively have bitcoins described as follows.

TABLE 3

| | | | |
|---|---|---|---|
| A | +1000 | −100 (to C) | −300 (to B) |
| B | +500 | −200 (to D) | +300 (from A) |
| C | 0 | +100 (from A) | +100 (from D) |
| D | 0 | +200 (from B) | −100 (to C) |

All of the records indicated in Tables 1 to 3 described above are transaction records. According to the transaction records described above, it can be seen at the time of Table 3 that A has bitcoins of 600 (=+1000-100-300), B similarly has bitcoins of 600, C has bitcoins of 200, and D has bitcoins of 100.

The bitcoin having such a structure is interesting in that some data as a main body of bitcoin is not delivered from the transferor to the transferee in the transfer of bitcoin between A to D in the example described above. In spite of this, attraction of the bitcoin structure is to specify the current balance of bitcoin of A to D as long as the transaction records exist. Again, in the bitcoin structure, there is no data corresponding to a coin entity, even though a naming of "coin" is used to recall a tangible object.

Noted that the phenomenon that the node administrator in the bitcoin structure wins the game and gains bitcoins can occur after the transaction is advanced to some extent, for example, after the time of Table 3.

In the bitcoin structure, as described above, each participant who participates in the bitcoin structure does not have data corresponding to his/her bitcoin. In other words, even though each participant's wallet is empty, since all past transaction records exist so as to be accessible and the balance of bitcoin at that time is specified in this way from the access record, the bitcoin structure is established based on mutual understanding or common illusion that the bitcoin of each participant should be like this.

For that reason, in order for all participants to believe in the common illusion, it is necessary to guarantee that the transaction record is accurate at any time or the transaction record cannot be falsified.

Bitcoin ensures the guarantee with block chain and the technology and idea of proof-of-work. The transaction records of bitcoin have a structure in which new transaction records are linked to previous transaction records. As new transaction record data (blocks) are continuously linked to the past transaction records, the transaction record data are linked in the form of chain of blocks. This is called a block chain. When a new block added to the block chain is generated, a value obtained by encryption of the previous block (more precisely, a hash value created from the data of the past block) is added to the new block. Thus, if the past block is falsified after the time when the new block is added to the block chain, the hash value is changed and the falsification is detected, and thus the data of the past block created previously cannot be falsified in actual fact.

In addition, blockchain data is recorded in a server called a node, which exists in large numbers on the Internet. The same blockchain data is recorded in each of the nodes. As described above, the administrator of the node is a participant in a certain kind of game described above. A person who can add a new transaction record block to the past transaction record is only a winner of the game described above. That is, when the number of persons, who can add a new block to a node, is limited to only one person, appropriate block data is ensured.

With the structure described above, since the blockchain recorded in each node cannot be falsified by the hash value or the hash value is changed when the falsification is made, the evidence of falsification is detected. Even when some of the blockchains recorded in each node are falsified likewise, including the hash value (for example, even when some of the blockchains recorded in multiple nodes are also falsified) so that the falsification of the past block data is not detected, if a large number of non-falsified blockchains exist out of the blockchains recorded in a large number of nodes, the falsification of the past block data can be made helpless including the hash value by setting this state to true, and the theory of majority rule is adopted in actual bitcoin. As described above, the node administrator can obtain bitcoins as a reward by winning the game. Using the bitcoins as motivation, the node administrators improve computing power of his/her computer. In order for a malicious third party to falsify a majority of the blockchains recorded in the node, it is necessary to prepare a computer having computing power of at least half of the sum of the computing power of many computers of the node administrators. A person who participates in the bitcoin structure trusts that the computer having such computing power cannot be prepared in actual fact. Such trust or confidential relationship guarantees the legitimacy of not only the blockchain but also the transaction record, and gives a certain kind of trust to the bitcoin.

SUMMARY OF INVENTION

Technical Problem

The structure of bitcoin is as described above, but the inventor of the present invention has big doubts that bitcoin is called virtual currency or bitcoin is even called crypto cash.

This is because, in the structure of bitcoin, a cryptographic technique is only used to guarantee the legitimacy of transaction records. That is, when a new block is added to the blockchain described above, a hash value of the previous block is taken.

Moreover, as described above, there is no data that is delivered from the value transferor to the transferee at the time of transferring the value. This means that currency (banknote or coin) of a tangible object is not used which mediates the transfer of value through the transfer thereof in functioning the currency.

That is, bitcoin may function as currency, but has not entity as money and is also extremely limited in the use of cryptography. The problem with the lack of entity as money is that all of the past transaction records are required to be recorded, resulting in causing great efforts and waste in recording of the large amount of data. Actually, the amount of blockchain data recorded in bitcoin is already enormous, and recording of the enormous blockchain data and recording of the same blockchain data in a large number of nodes cause tremendous waste. On the other hand, when data is circulated among users in replace of money, the safety of the data becomes a problem.

From such a point of view, although being very vague, there is an idea that a cryptographic technique should be utilized to establish virtual currency, and there is a possibility that safe virtual currency, more specifically, safe virtual money can be established using appropriately the cryptographic technique. Bitcoin may be referred to as cryptocurrency or the like, and this is a way to give the user an "image" of safety due to use of cryptography.

In the bitcoin as described above, however, the use of the cryptographic technique is extremely limited.

In a case of exchanging a value called DigiCash or e-cash between users, virtual currency using data in replace of money to be exchanged has existed in the past, and the cryptographic technique has also been used for such virtual currency. However, the cryptographic technique used in such virtual currency merely means that data for authentication indicating the used data is authentic data is encrypted and attached to data having a monetary value.

An object of the present invention is to provide virtual currency that is data created as crypto cash in a true meaning.

Solution to Problem

In order to solve such a problem, the inventor of the present invention proposes the invention to be described below.

The present invention is to provide data structure of virtual currency data that is data of virtual currency having a monetary value and is used in combination with a settlement device that accepts settlement when the virtual currency data is received from a predetermined device via a network and when predetermined conditions are satisfied.

The data structure of virtual currency data includes virtual currency encryption data which is data obtained by, according to a predetermined encryption method, encryption of: issuer information including at least information on an issuer of the virtual currency data; amount information that is information for specifying a monetary value; and settlement condition information that is information on conditions for accepting payment with virtual currency.

The virtual currency data having such a data structure is used in combination with the settlement device that determines whether the settlement is accepted. As will be described below, there are three types of settlement devices, all of which use encryption technology. The virtual currency data having the data structure as described above may be naturally required to satisfy other conditions, but the settlement device can accept the settlement when the following conditions are satisfied. As will be described below, since virtual currency realized by the virtual currency data of the present invention has the virtual currency data to be exchanged at the time of value exchange, it is not necessary to record a large number of transaction record data, and the virtual currency data has high safety because, so to speak, the body of its monetary value is encrypted.

In addition, the term "encryption" in the present invention means that the data is converted so that the data cannot be read (not understood) without special knowledge even when a third party looks at the data, and includes not only conversion in which data can be decrypted but also a case of irreversible conversion as in a case of taking a hash value.

The settlement conditions specified by the settlement condition information included in the state of being encrypted in the data structure of virtual currency data in the present invention may be arbitrary. Examples of the settlement conditions include a restriction on a value transferor or transferee, a restriction on the place of a value transferor or transferee, a restriction on the time at which the value can be transferred, and a restriction on the number of times the same person can transfer the value within a certain period of time.

For example, in the data structure of virtual currency data according to the present invention, the settlement condition information may include recipient information that is information for specifying a person who receives the payment. Since the virtual currency data having such a data structure can limit the person who can receive the payment, even when such virtual currency data is stolen by a malicious third party, the third party is not a person specified by the recipient information, and thus the malicious third party cannot receive the monetary value.

In addition, the settlement condition information may include time information that is information for specifying a time (period) at which the payment is accepted. Since the virtual currency data having such a data structure can limit the time at which the payment can be received, even when such virtual currency data is stolen by a malicious third party, the malicious third party cannot receive the monetary value when the stolen data passes the due date at which the payment is received. Further, when the payment time is set as the validated date of the virtual currency data, those who have the virtual currency data have to be settled it urgently, or the use of the virtual currency data can be promoted to use it.

The settlement condition information may be information for changing an amount of money specified by the amount information.

For example, the amount of money specified by the amount information can be changed with the passage of time by the settlement condition information. Specifically, the amount of money specified by the amount information can be gradually reduced with the passage of time by the settlement condition information, or the amount of money specified by the amount information can be reduced in a step-by-step manner with the passage of time by the settlement condition information, but this urges a person who has the virtual currency data including the virtual currency encryption data including the data obtained by encryption of the settlement condition information to use the virtual currency data. Naturally, the amount of money specified by the amount information may be increased, or may be increased and reduced. Thus, it is possible to induce the consumption behavior of the user (s) having such virtual currency data, for example, to accelerate the payment using the virtual currency data, to delay the payment using the virtual currency data, and to concentrate the payment using the virtual currency data at a certain time or avoid it at a certain time.

In addition, the amount of money specified by the amount information can be changed by the settlement condition information, depending on the payment place, the transferor or transferee at the time of the payment, and the number of times the payment is performed by the same person at a certain time or the same person receives the payment. Thus, the consumption behavior of the user (s) can also be induced.

The issuer information encrypted and included in the data structure of virtual currency data according to the present invention may include information other than an issuer. For example, the issuer information further may include not only issuer information that is information for specifying an issuer of the virtual currency data but also at least one of: authentication information that is information to guarantee authenticity of the virtual currency data, the information being issued by a person having authority to guarantee the authenticity of the virtual currency data; serial number information that is information unique to each virtual currency data for distinguishing the virtual currency data from other virtual currency data; and timing information that is information for specifying a timing at which the virtual currency data is issued.

In the data structure of virtual currency data according to the present invention, encryption condition information, which is information for specifying a condition when the issuer information, the amount information, and the settlement condition information are encrypted, may be further attached. This is useful in a settlement device to be described below, and particularly useful in virtual currency data used in combination with first and third types of settlement devices to be described below. Note that the encryption condition information may or may not be encrypted.

The data structure of virtual currency data according to the present invention may be further attached with at least a part of the issuer information, the amount information, and the settlement condition information in an unencrypted state.

As described above, the issuer information, the amount information, and the settlement condition information are encrypted virtual currency encryption data in the present invention. This makes it possible to increase the safety of the virtual currency data, but to cause inconvenience that the value transferee out of the value transferor and transferee does not know he/she receives how much the amount of money under certain conditions. Such inconvenience can be solved in a manner that at least a part of the issuer information, the amount information, and the settlement condition information is made as readable plaintext data, for example, is read without being decrypted by a receiving device or a transmission device to be described below.

Naturally, the virtual currency data having the data structure of the virtual currency data described above may be recorded in a recording medium. The recording medium is not limited to a portable recording medium, and may be a recording medium built in a predetermined device. The recording medium built in the predetermined device is, for example, a random access memory (RAM) or a hard disk drive (HDD).

The predetermined device may be a receiving device including a terminal device receiving means receiving data via the network, the recording medium described above built therein, and the virtual currency data may be recorded on the recording medium after being received by the terminal device receiving means.

The predetermined device may be a transmission device including a first transmission means transmitting data via the network, the recording medium described above built therein, and the virtual currency data may be transmitted to the settlement device via the network by the transmission means.

Next, three types of settlement devices will be described.

A first type of settlement device is a settlement device including: a settlement device receiving means that receives virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a decryption means that decrypts the virtual currency encryption data received by the settlement device receiving means; a settlement condition determining means that determines whether a condition specified by the settlement condition information obtained by decryption of the virtual currency encryption data with the decryption means is satisfied; and a settlement means that accepts settlement of an amount of money specified by the amount information obtained by decryption of the virtual currency encryption data with the decryption means when the settlement condition determining means determines that the condition specified by the settlement condition information is satisfied.

The virtual currency data used in combination with the first type of settlement device is the virtual currency data having the data structure of the virtual currency data according to the present invention, and the virtual currency encryption data included therein is limited to encrypted data capable of being decrypted. Upon receiving the virtual currency data, the first settlement device decrypts the virtual currency encryption data included in the virtual currency data. Then, the settlement device accepts the settlement of the amount of money specified by the amount information on condition that the condition specified by the settlement condition information included in the decrypted virtual currency encryption data is satisfied. In this case, the authenticity of the virtual currency data may be authenticated by the issuer information, the authenticity is proved by the fact that the virtual currency encryption data can be originally decrypted. By setting whether the decryption can be made as an authentication condition, it is possible to increase the accuracy of confirmation of the authenticity of the virtual currency data executed by such a settlement device, and as a result, to increase the safety of the virtual currency data used together with a settlement device executed by such a settlement device. The issuer information may also be used for confirming the validity of the virtual currency encryption data as in second and third types of settlement devices to be described below.

The first type of settlement device includes the decryption means, and decrypts the virtual currency encryption data using the decryption means. Needless to say, a large number of pieces of the virtual currency data exist at the same time, for example, on the network, on the recording medium described above, or in the predetermined device described above. When the encryption method, for example, both a key and an algorithm are always the same, the decryption means of the settlement device can always decrypt the virtual currency encryption data with a combination of one kind of key and algorithm. However, if the safety of the virtual currency data is desired to be increased, it is obvious that at least one of the virtual currency encryption data included in a large number of pieces of virtual currency data, or if possible, all the virtual currency encryption data is preferably encrypted by a method different from that used for other virtual currency encryption data. However, when such a technique is adopted, the decryption means should grasp how to encrypt the virtual currency encryption data to be decrypted. This can be achieved by the encryption condition information described above.

When the settlement device includes means that grasps, from the encryption condition information attached to the virtual currency encryption data to be decrypted by the decryption means, a condition when the virtual currency encryption data is encrypted, the decryption means can know the condition when the virtual currency encryption data is encrypted, and thus there is no inconvenience in decrypting the virtual currency encryption data even if the virtual currency encryption data are respectively encrypted under different conditions. The encryption condition information may or may not be encrypted as described above. The encryption condition information, which is not encrypted, can be used as it is. On the other hand, if the encryption condition information is encrypted, the encryption condition information cannot be used unless being decrypted. Even when the virtual currency encryption data are respectively encrypted under different conditions, the encrypted encryption condition data can be decrypted by a predetermined means of the settlement device, for example, by the decryption means if the encrypting condition of the encryption condition information is equal any time.

The encryption condition information may be the above-described key or algorithm itself used when the virtual currency encryption data is encrypted, or may be information for specifying which key or algorithm is used when the virtual currency encryption data is encrypted. For example, when the virtual currency data is encrypted, the encryption is assumed to be performed with different keys, which are sequentially changed, such as a first key when the first virtual currency data is encrypted, a second key when the second virtual currency data is encrypted, a third key when the third virtual currency data is encrypted, and so on. Then, these keys are assumed to be pseudo-random numbers generated continuously by the following formula, for example. Then, since an N-th pseudo-random number is always the same when an initial value Xo is specified from the beginning, a means for grasping the condition when the virtual currency encryption data is encrypted can reproduce the N-th pseudo-random number at any time from Xo. Thereby, the decryption means can decrypt the virtual currency encryption data using the pseudo-random number as a key. If the initial value Xo is hidden, even when the encryption condition information (a numerical value indicating what number pseudo-random number) included in the virtual currency data is included in the virtual currency data in plaintext, a malicious third party who obtains the virtual currency data cannot grasp the condition when the virtual currency encryption data is encrypted from encryption condition information. Further, as described above, at least a part of the issuer information, the amount information, and the settlement condition information may be further attached to the virtual currency data in an unencrypted state, but, for example, some of the data may also serve as encryption condition information.

$$X_N = f(X_{N-1})$$

($X_N$ is the N-th pseudo-random number, and the pseudo-random number is formed from numbers, characters, symbols, or an enumeration of two or more of them.)

The inventor of the present invention also proposes a method executed by the first type of settlement device described above, as one aspect. The effect thereof is equal to that of the first settlement device. For example, the method is as follow.

The method is a settlement method executed by a settlement device capable of receiving data via a network and including a computer for performing data processing.

The settlement method includes steps executed by the computer of: a settlement device receiving step of receiving virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a decryption step of decrypting the virtual currency encryption data received in the settlement device receiving step; a settlement condition determining step of determining whether a condition specified by the settlement condition information obtained by decryption of the virtual currency encryption data in the decryption step is satisfied; and a settlement step of accepting settlement of an amount of money specified by the amount information obtained by decryption of the virtual currency encryption data in the decryption step when being determined in the settlement condition determining step that the condition specified by the settlement condition information is satisfied.

The inventor of the present invention also proposes, for example, a computer program for causing a general-purpose computer to function as the first type of settlement device described above, as one aspect of the present invention. For example, the computer program is as follow.

The computer program is a computer program for causing a computer capable of receiving data via a network and performing data processing to function as a settlement device.

The computer program is a computer program for causing the computer to function as: a settlement device receiving means that receives virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a decryption means that decrypts the virtual currency encryption data received by the settlement device receiving means; a settlement condition determining means that determines whether a condition specified by the settlement condition information obtained by decryption of the virtual currency encryption data with the decryption means is satisfied; and a settlement means that accepts settlement of an amount of money specified by the amount information obtained by decryption of the virtual currency encryption data with the decryption means when the settlement condition determining means determines that the condition specified by the settlement condition information is satisfied.

A second type of settlement device is a settlement device including: a settlement device receiving means that receives virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a copy data recording means that records copy virtual currency encryption data that is data equal to the virtual currency encryption data; a second authentication means that compares the virtual currency encryption data received by the settlement device receiving means with the copy virtual currency encryption data to determine whether both of the data coincide with each other, and determines that the virtual currency data sent from the predetermined device is authentic when both of the data coincide with each other; a settlement condition determining means that determines whether a condition specified by the settlement condition information is satisfied; and a settlement means that accepts settlement of an amount of money specified by the amount information when the second authentication means determines that the virtual currency data sent from the predetermined device is authentic and the settlement condition determining means determines that the condition specified by the settlement condition information is satisfied.

The virtual currency data used in combination with the second type of settlement device is the virtual currency data having the data structure of the virtual currency data according to the present invention, but the virtual currency encryption data included therein is not limited to encrypted data capable of being decrypted. The second settlement device includes the copy data recording means that records the copy virtual currency encryption data that is data equal to the virtual currency encryption data included in a large number of pieces of virtual currency data scheduled to be sent to the settlement device. Upon receiving the virtual currency data, the settlement device compares the virtual currency encryption data included in the virtual currency data with the copy virtual currency encryption data recorded in the copy data recording means. As a result, the settlement device determines whether one of the copy virtual currency encryption data recorded in the copy data recording means coincides with the virtual currency encryption data included in the received virtual currency data, determines that the virtual currency encryption data is authentic when the virtual currency encryption data coincides with one of the copy virtual currency encryption data, and accepts the settlement for the data of the amount of money specified by the amount information on condition that the condition specified by the settlement condition information is satisfied. In short, according to the first settlement device, whether the virtual currency data including the virtual currency encryption data is authentic is determined depending on whether the virtual currency encryption data can be decrypted, but, alternatively, according to the second settlement device, whether the virtual currency data is authentic is determined depending on the comparison between the virtual currency encryption data and the copy virtual currency encryption data prepared in advance by copying the virtual currency encryption data. Therefore, even in the second settlement device as in the first settlement device, it is possible to increase the accuracy of confirmation of the authenticity of the virtual currency data executed by such a settlement device, and as a result, to increase the safety of the virtual currency data used together with a settlement device executed by such a settlement device.

As described above, the second settlement device determines whether the settlement condition specified by the settlement condition information is satisfied. For this purpose, naturally, the settlement condition information is required. The settlement condition information may be recorded in, for example, the copy data recording means in association with each of the copy virtual currency encryption data corresponding the settlement condition information, or may be obtained by decrypting the copy virtual currency encryption data or the virtual currency encryption data as needed. Similarly, the issuer information may also be recorded in, for example, the copy data recording means in association with each of the copy virtual currency encryption data corresponding the issuer information, or may be obtained by decrypting the copy virtual currency encryption data or the virtual currency encryption data, and thus the issuer information can be used to confirm the authenticity of the virtual currency data.

The inventor of the present invention also proposes a method executed by the second type of settlement device described above, as one aspect of the present invention. The effect thereof is equal to that of the second settlement device. For example, the method is as follow.

The method is a settlement method executed by a settlement device capable of receiving data via a network and including a recording medium and a computer for performing data processing.

The settlement method includes steps executed by the computer of: a settlement device receiving step of receiving virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a copy data recording step of recording copy virtual currency encryption data, which is data equal to the virtual currency encryption data, in the recording medium; a second authentication step of comparing the virtual currency encryption data received by the settlement device receiving unit with the copy virtual currency encryption data recorded in the recording medium to determine whether both of the data coincide with each other, and determining that the virtual currency data sent from the predetermined device is authentic when both of the data coincide with each other; a settlement condition determining step of determining whether a condition specified by the settlement condition information is satisfied; and a settlement step of accepting settlement of an amount of money specified by the amount information when being determined in the second authentication step that the virtual currency data sent from the predetermined device is authentic and being determined in the settlement condition determining step that the condition specified by the settlement condition information is satisfied.

The inventor of the present invention also proposes, for example, a computer program for causing a general-purpose computer to function as the second type of settlement device described above, as one aspect of the present invention. For example, the computer program is as follow.

The computer program is a computer program for causing a computer capable of receiving data via a network and performing data processing to function as a settlement device.

The computer program is a computer program causing the computer to function as: a settlement device receiving means that receives virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a copy data recording means that records copy virtual currency encryption data that is data equal to the virtual currency encryption data; a second authentication means that compares the virtual currency encryption data received by the settlement device receiving means with the copy virtual currency encryption data to determine whether both of the data coincide with each other, and determines that the virtual currency data sent from the predetermined device is authentic when both of the data coincide with each other; a settlement condition determining means that determines whether a condition specified by the settlement condition information is satisfied; and a settlement means that accepts settlement of an amount of money specified by the amount information when the second authentication means determines that the virtual currency data sent from the predetermined device is authentic and the settlement condition determining means determines that the condition specified by the settlement condition information is satisfied.

A third type of settlement device is a settlement device including: a settlement device receiving means that receives virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a plaintext information recording means that records, in association with each other, the issuer information, the amount information, and the settlement condition information included in one virtual currency encryption data in an encrypted state; an encryption means that encrypts the issuer information, the amount information, and the settlement condition information recorded in the plaintext information recording means using an encryption method equal to the predetermined encryption method used when the issuer information, the amount information, and the settlement condition information are encrypted into the virtual currency encryption data; a third authentication means that compares the virtual currency encryption data received by the settlement device receiving means with the data obtained by encryption of the issuer information, the amount information, and the settlement condition information recorded in the plaintext information recording means with the encryption means to determine whether both of the data coincide with each other, and determines that the virtual currency data sent from the predetermined device is authentic when both of the data coincide with each other; a settlement condition determining means that determines whether a condition specified by the settlement condition information recorded in the plaintext information recording means is satisfied; and a settlement means that accepts settlement of an amount of money specified by the amount information when the third authentication means determines that the virtual currency data sent from the predetermined device is authentic and the settlement condition determining means determines that the condition specified by the settlement condition information is satisfied.

The virtual currency data used in combination with the third type of settlement device is the virtual currency data having the data structure of the virtual currency data according to the present invention, but the virtual currency encryption data included therein is not limited to encrypted data capable of being decrypted. The third settlement device includes the plaintext information recording means that records, in association with each other, the issuer information, the amount information, and the settlement condition information which are used to generate the virtual currency encryption data included in a large number of pieces of virtual currency data scheduled to be sent to the settlement device. Upon receiving the virtual currency data, the settlement device generates the data by encrypting the issuer information, the amount information, and the settlement condition information which are recorded in the plaintext information recording means described above and in association with each other. Then, the settlement device determines that the virtual currency data is authentic when the data coincides with the virtual currency encryption data included in the received virtual currency data. The settlement device accepts the settlement for the data of the amount of money specified by the amount information on condition that the virtual currency data is determined to be authentic and the condition specified by the settlement condition information is satisfied. In short, according to the first settlement device, whether the virtual currency data including the virtual currency encryption data is authentic is determined depending on whether the virtual currency encryption data can be decrypted, but, alternatively, according to the third settlement device, whether the virtual currency data is authentic is determined depending on whether the same data as the virtual currency encryption data can be created again by the encryption of the issuer information, the amount information, and the settlement condition information. Therefore, even in the third settlement device as in the first settlement device, it is possible to increase the accuracy of confirmation of the authenticity of the virtual currency data executed by such a settlement device, and as a result, to increase the safety of the virtual currency data used together with a settlement device executed by such a settlement device.

The third type of settlement device includes the encryption means, and encrypts the issuer information, the amount information, and the settlement condition information which are recorded in the plaintext information recording means by the encryption means. Needless to say, a large number of pieces of the virtual currency data exist at the same time, for example, on the network, on the recording medium described above, or in the predetermined device described above. When the encryption method, for example, both a key and an algorithm are always the same, the encryption means of the settlement device encrypts the issuer information, the amount information, and the settlement condition information which are recorded in the plaintext information recording means, with a combination of one kind of key and algorithm, and the data obtained in this way coincides with the virtual currency encryption data included in the virtual currency data sent to the settlement device, unless the virtual currency encryption data is particularly falsified. On the other hand, at least one of the virtual currency encryption data included in a large number of pieces of virtual currency data, or if possible, all the virtual currency encryption data may be encrypted by a method different from that used for other virtual currency encryption data. In this case, when the method of encrypting the issuer information, the amount information, and the settlement condition information using the encryption means does not coincide with the method used when the virtual currency encryption data is encrypted to be compared therewith, the data obtained by the encryption of the issuer information, the amount information, and the settlement condition information recorded in the plaintext information recording means does not coincide with the virtual currency encryption data included in the virtual currency data sent to the settlement device. That is, the settlement device should grasp how to encrypt the virtual currency encryption data included in the virtual currency data sent to the settlement device. This can be achieved by the encryption condition information described above. The contents and usage of the data may be the same as those described in the first settlement device.

The inventor of the present invention also proposes a method executed by the third type of settlement device described above, as one aspect of the present invention. The effect thereof is equal to that of the third settlement device. For example, the method is as follow.

The method is a settlement method executed by a settlement device capable of receiving data via a network and including a computer for performing data processing.

The settlement method includes steps executed by the computer of: a settlement device receiving step of receiving virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a plaintext information recording step of recording the issuer information, the amount information, and the settlement condition information, which are included in one virtual currency encryption data in an encrypted state, in the recording medium in association with each other; an encryption step of encrypting the issuer information, the amount information, and the settlement condition information recorded in the plaintext information recording step using an encryption method equal to the predetermined encryption method used when the issuer information, the amount information, and the settlement condition information are encrypted into the virtual currency encryption data; a third authentication step of comparing the virtual currency encryption data received in the settlement device receiving step with the data obtained by encryption, in the encryption step, of the issuer information, the amount information, and the settlement condition information recorded in the plaintext information recording step to determine whether both of the data coincide with each other, and determining that the virtual currency data sent from the predetermined device is authentic when both of the data coincide with each other; a settlement condition determining step of determining whether a condition specified by the settlement condition information recorded in the plaintext information recording step is satisfied; and a settlement step of accepting settlement of an amount of money specified by the amount information when being determined in the third authentication step that the virtual currency data sent from the predetermined device is authentic and being determined in the settlement condition determining step that the condition specified by the settlement condition information is satisfied.

The inventor of the present invention also proposes, for example, a computer program for causing a general-purpose computer to function as the third type of settlement device described above, as one aspect of the present invention. For example, the computer program is as follow.

The computer program is a computer program for causing a computer capable of receiving data via a network and performing data processing to function as a settlement device.

The computer program causes the computer to function as: a settlement device receiving means that receives virtual currency data, which is data of virtual currency having a monetary value, via a network from a predetermined device for requesting settlement, the virtual currency data including virtual currency encryption data which is data obtained by, according to a predetermined encryption method, encryption of issuer information including at least information on an issuer of the virtual currency data, amount information that is information for specifying a monetary value, and settlement condition information that is information on conditions for accepting payment with virtual currency; a plaintext information recording means that records, in association with each other, the issuer information, the amount information, and the settlement condition information included in one virtual currency encryption data in an encrypted state; an encryption means that encrypts the issuer information, the amount information, and the settlement condition information recorded in the plaintext information recording means using an encryption method equal to the predetermined encryption method used when the issuer information, the amount information, and the settlement condition information are encrypted into the virtual currency encryption data; a third authentication means that compares the virtual currency encryption data received by the settlement device receiving means with the data obtained by encryption of the issuer information, the amount information, and the settlement condition information recorded in the plaintext information recording means with the encryption means to determine whether both of the data coincide with each other, and determines that the virtual currency data sent from the predetermined device is authentic when both of the data coincide with each other; a settlement condition determining means that determines whether a condition specified by the settlement condition information recorded in the plaintext information recording means is satisfied; and a settlement means that accepts settlement of an amount of money specified by the amount information when the third authentication means determines that the virtual currency data sent from the predetermined device is authentic and the settlement condition determining means determines that the condition specified by the settlement condition information is satisfied.

The inventor of the present invention also proposes the virtual currency data generating device for generating the virtual currency data having the data structure of the virtual currency data according to the present invention, as one aspect of the present invention. The effect according to this aspect is equal to that described in the data structure of the virtual currency data according to the present invention.

An example of the virtual currency data generating device is a virtual currency data generating device including: a currency generating and encrypting means that encrypts, according to a predetermined encryption method, issuer information including at least information on an issuer of a virtual currency data, amount information that is information for specifying a monetary value, and settlement condition information that is information on conditions for accepting payment with virtual currency, and thus generates virtual currency encryption data which is data obtained by encryption of the issuer information, the amount information, and the settlement condition information, the virtual currency data generating device being capable of generating virtual currency data which includes the virtual currency encryption data and is data of virtual currency having a monetary value.

The above-described virtual currency data generating device may be integrated with one of the above-described settlement devices according to the present invention, the virtual currency data generating device including: a currency generating and encrypting means that encrypts, according to a predetermined encryption method, issuer information including at least information on an issuer of a virtual currency data, amount information that is information for specifying a monetary value, and settlement condition information that is information on conditions for accepting payment with virtual currency, and thus generates virtual currency encryption data which is data obtained by encryption of the issuer information, the amount information, and the settlement condition information, the virtual currency data generating device thus being capable of generating virtual currency data which includes the virtual currency encryption data and is data of virtual currency having a monetary value.

The inventor of the present invention also proposes the method executed by the virtual currency data generating device described so far, as one aspect of the present invention. The effect thereof is equal to that of the virtual currency data generating device.

An example of the method is a method executed by a virtual currency data generating device including a computer and capable of generating virtual currency data which is data of virtual currency having a monetary value, the method including a step executed by the computer for encrypting, according to a predetermined encryption method, issuer information including at least information on an issuer of the virtual currency data, amount information that is information for specifying a monetary value, and settlement condition information that is information on conditions for accepting payment with virtual currency, and thus generating virtual currency encryption data which is data obtained by encryption of the issuer information, the amount information, and the settlement condition information, and thus generating virtual currency data which includes the virtual currency encryption data and is data of virtual currency having a monetary value.

The inventor of the present invention also proposes, for example, a computer program for causing a general-purpose computer to function as the virtual currency data generating device described above, as one aspect of the present invention. For example, the computer program is as follow.

This is a computer program for causing a computer to function as the virtual currency data generating device capable of generating virtual currency data which is the data of the virtual currency having the monetary value.

The computer program is a computer program for causing the computer to function as: a currency generating and encrypting means that encrypts, according to a predetermined encryption method, issuer information including at least information on an issuer of the virtual currency data, amount information that is information for specifying a monetary value, and settlement condition information that is information on conditions for accepting payment with virtual currency, and thus generates virtual currency encryption data which is data obtained by encryption of the issuer information, the amount information, and the settlement condition information, and thus the computer program causing the computer to generate virtual currency data which includes the virtual currency encryption data and is data of virtual currency having a monetary value.

BRIEF DESCRIPTION OF DRAWINGS

FIGS. 10(A) and 10(B) are diagrams showing an example of an image displayed on a display of the user terminal included in the settlement system shown in FIG. 1;

FIG. 11 is a diagram showing notionally the content of a part of data recorded on a basic data recording unit in the settlement device included in the settlement system shown in FIG. 1;

FIG. 12(A) is a diagram showing notionally a data structure of plaintext data serving as an origin of virtual currency encryption data contained in virtual currency data used in the settlement system shown in FIG. 1, and FIG. 12(B) is a diagram showing notionally a data structure of the virtual currency data used in the settlement system shown in FIG. 1;

DESCRIPTION OF EMBODIMENTS

Figure 1:
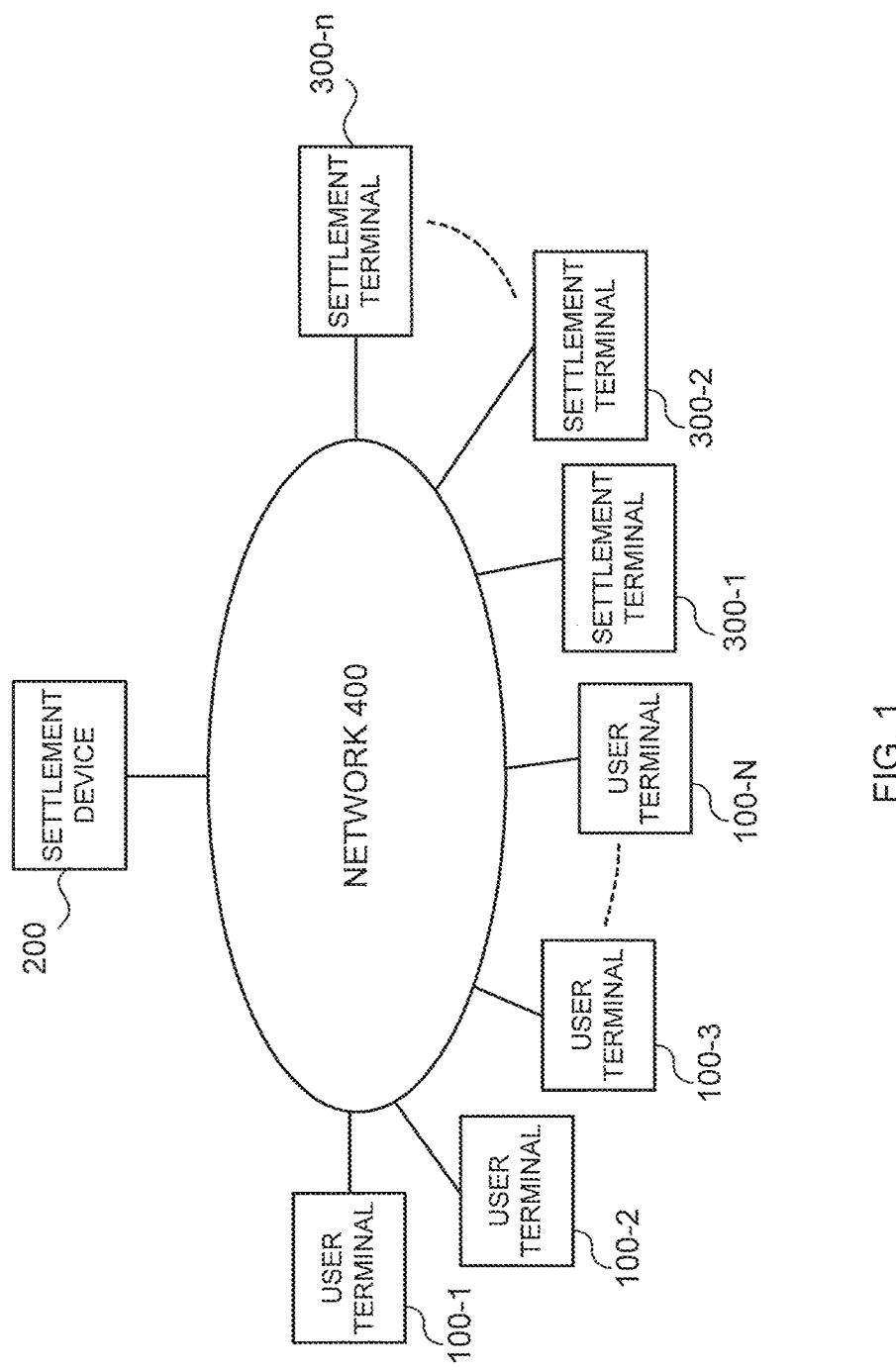
FIG. 1 is a diagram showing an overall structure of a settlement system according to a first embodiment.

First to third embodiments of the present invention will be described below. In the description of each embodiment and modification example, the same element is denoted by the same reference numeral and duplication description will not be presented in some cases.

First Embodiment

FIG. 1 schematically shows an overall configuration of a settlement system according to a first embodiment.

The settlement system is configured to include a plurality of user terminals 100-1 to 100-N (which may also hereinafter simply be described as "user terminal 100."), a settlement device 200, and settlement terminals 300-1 to 300-n (which may also hereinafter simply be described as "settlement terminal 300."). These are all connectable to a network 400.

The network 400 is the Internet in this embodiment without being limited thereto.

The user terminal 100 is an example of a receiving device according to the present invention, the settlement terminal 300 is an example of a transmission device according to the present invention, and the settlement device 200 is an example of a settlement device according to the present invention.

Although not limited thereto, in this embodiment, payment of money using virtual currency data to be described below is, in principle, performed on an administrator (who manages or owns the settlement terminal 300, for example) of the settlement terminal 300 from an administrator (owner) of the user terminal 100, and is performed on an administrator of another user terminal 100 from an administrator of one user terminal 100 in some cases.

Normally, the user terminal 100 is possession of each user. The user terminal 100 includes a computer. The user terminal 100 is a mobile phone, a smartphone, a tablet, a notebook computer, a desktop computer, or the like. Among them, the smartphone or the tablet is particularly preferable for use as the user terminal 100, considering that the smartphone or the tablet is portable and suitable for installation of computer programs to be described below. The smartphone is, for example, an iPhone that is manufactured and sold by Apple Japan, LLC. An example of the tablet is an iPad that is manufactured and sold by Apple Japan, LLC.

Hereinafter, the description is made assuming that the user terminal is the smartphone, but is not limited thereto.

The user terminal 100 at least needs to be capable of receiving data, but may also be capable of transmitting data. In this embodiment, since the user terminal 100 is the smartphone, it is naturally possible to receive and transmit data.

A configuration of the user terminal 100 will be described below. Each of the user terminals 100-1 to 100-N has the same configuration in relation to the present invention.

Figure 2:
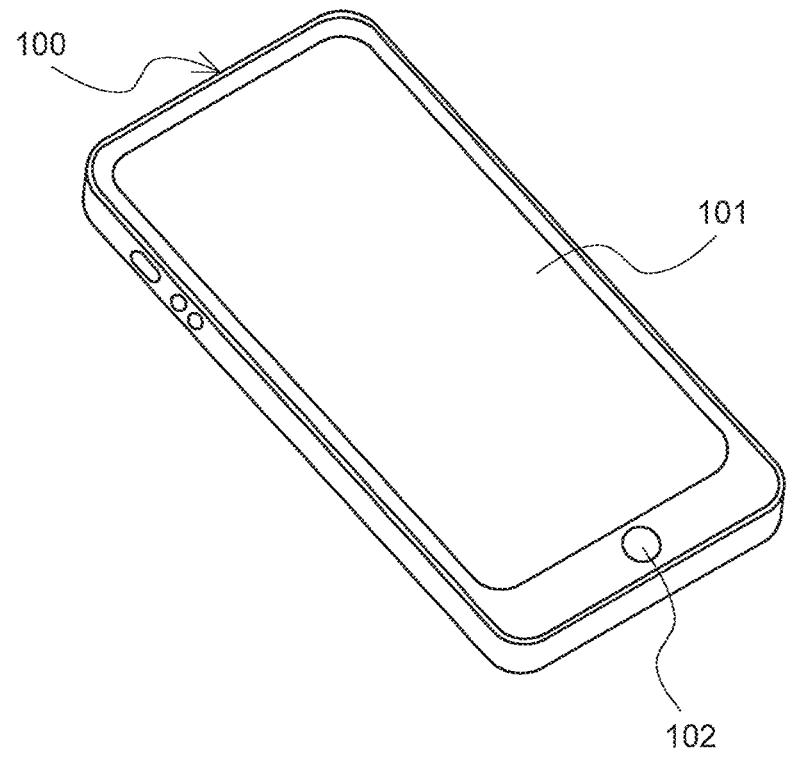
FIG. 2 is a diagram showing an external appearance of a user terminal included in the settlement system shown in FIG. 1.

An example of external appearance of the user terminal 100 is shown in FIG. 2.

The user terminal 100 includes a display 101. The display 101 is used to display still images or moving images, and a publicly known or well-known display can be used. The display 101 is, for example, a liquid crystal display. The user terminal 100 also includes an input device 102. The input device 102 is used for the user to perform a desired input on the user terminal 100. A publicly known or well-known input device can be used as the input device 102. The input device 102 of the user terminal 100 in this embodiment is a button-type input device, but is not limited thereto, and a numeric keypad, a keyboard, a trackball, a mouse, or the like can also be used. Moreover, when the display 101 is a touch panel, the display 101 also has a function of the input device 102, which is applied to this embodiment.

Data input from the input device 102 will be described in detail below, but include, for example, generation request information on a generation request of virtual currency data, payment information on use of virtual currency data, transfer information on transfer of virtual currency data, and a user ID.

Figure 3:
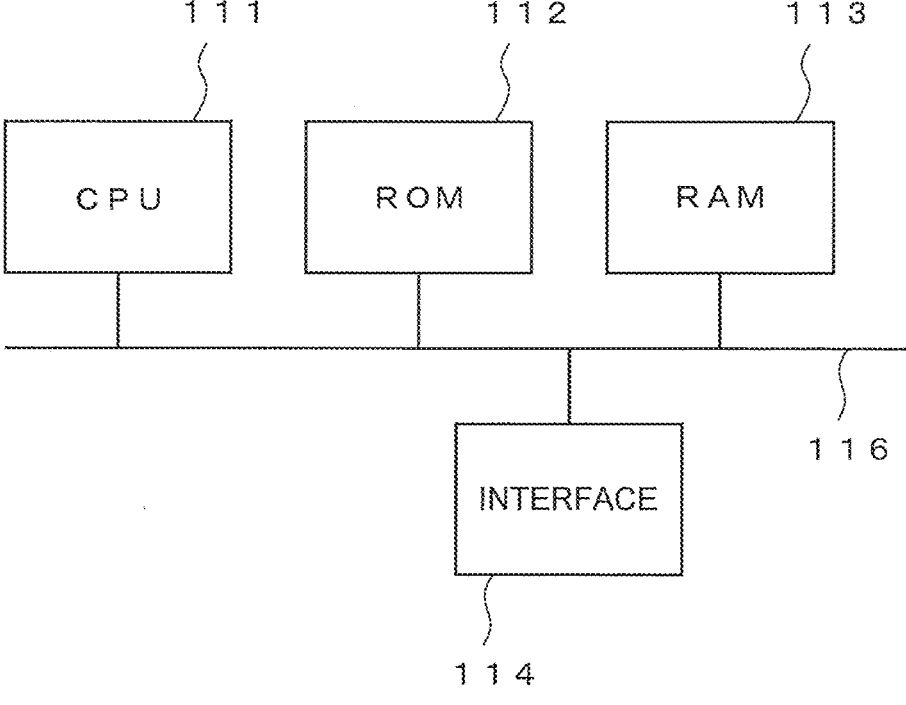
FIG. 3 is a diagram showing a configuration of hardware of the user terminal included in the settlement system shown in FIG. 1.

A configuration of hardware of the user terminal 100 is shown in FIG. 3.

The hardware includes a CPU (central processing unit) 111, a ROM (read only memory) 112, a RAM (random access memory) 113, and an interface 114, which are interconnected by a bus 116.

The CPU 111 is an arithmetic operation device that performs arithmetic operations. The CPU 111, for example, executes a computer program recorded in the ROM 112 to execute processing to be described below. It should be noted that the computer program used herein includes at least a computer program for causing the user terminal 100 to function as a receiving device of the present invention. The computer program may be pre-installed in the user terminal 100, or may be post-installed. The computer program may be installed in the user terminal 100 via a predetermined recording medium (not shown) such as a memory card, or may be installed via a network such as the Internet.

The ROM 112 records computer programs and data necessary for the CPU 111 to execute processing to be described below. The computer program recorded in the ROM 112 is not limited thereto. For example, when the user terminal 100 is the smartphone, a computer program and data are recorded, for example, for executing telephone calls or e-mails, which are required to cause the user terminal to function as the smartphone. The user terminal 100 can also browse a homepage based on data received via the network 400, and is mounted with a publicly known web browser for enabling the browsing of the homepage.

The RAM 113 provides a work area necessary for the CPU 111 to perform processing. Virtual currency data to be described below may be recorded in the RAM 113.

The interface 114 performs data exchange between the CPU 111 and the RAM 113 connected via the bus 116 and the outside. The display 101 and the input device 102 described above are connected to the interface 114. The operation content input from the input device 102 is input to the bus 116 from the interface 114, and image data to be described below is output to the display 101 from the interface 114. The interface 114 is also connected to a transmission and reception unit, which is not shown.

The transmission and reception unit transmits and receives data via the network 400 that is the Internet. Such communication may also be performed in a wired manner, but when the user terminal 100 is the smartphone, the communication is wirelessly performed in general. As long as it is possible, the transmission and reception unit may have a publicly known or well-known configuration. The data (for example, virtual currency data) received by the transmission and reception unit from the network 400 is received through the interface 114, and the data (for example, virtual currency data) passed from the interface 114 to the transmission and reception unit is sent to the outside, for example, to the settlement device 200 by the transmission and reception unit via the network 400.

Figure 4:
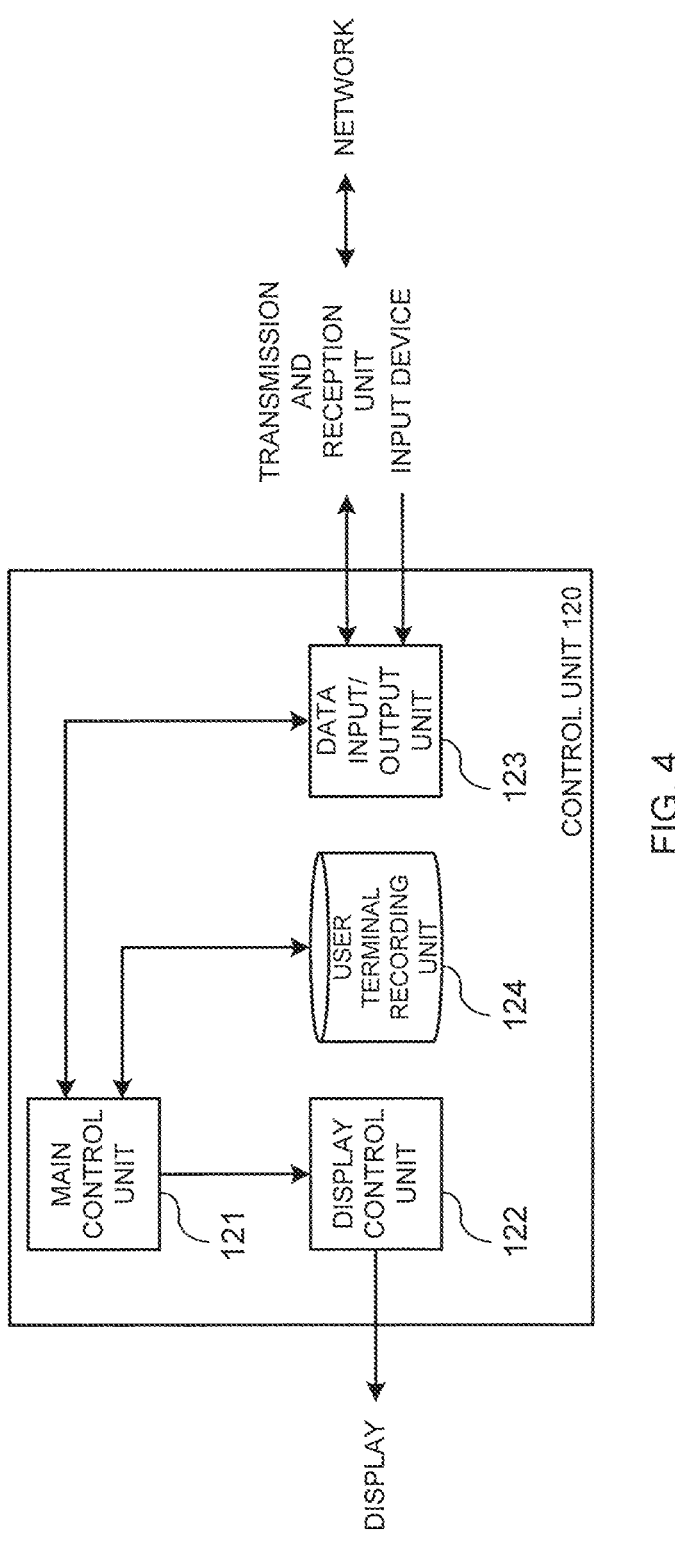
FIG. 4 is a block diagram showing functional blocks generated inside the user terminal included in the settlement system shown in FIG. 1.

Functional blocks as shown in FIG. 4 are generated within the user terminal 100 when the CPU 111 executes the computer program. It should be noted that while the following functional blocks may be generated with functions of the above-described computer program alone for causing the user terminal 100 to function as the user terminal of the present invention, the following functional blocks may be generated in cooperation with the above-described computer program and an OS and other computer programs installed in the user terminal 100.

A control unit 120 to be described below is generated in the user terminal 100 in relation to functions of the present invention, and a main control unit 121, a display control unit 122, a data input/output unit 123, and a user terminal recording unit 124 are generated in the control unit 120.

The control unit 120 executes information processing as will be described below.

The main control unit 121 performs overall control within the control unit 120. For example, the main control unit 121 controls the display control unit 122 based on data received from the data input/output unit 123 to be detailed below.

The main control unit 121 may receive virtual currency data to be described below from the data input/output unit 123 that will be described below. Upon receiving the data, the main control unit 121 sends it to the user terminal recording unit 124 or the display control unit 122. The main control unit 121 may read the virtual currency data from the user terminal recording unit 124 as will be described below. The main control unit 121, which has read the virtual currency data, instructs the display control unit 122 to display based on the virtual currency data, and sends it to the data input/output unit 123 in some cases.

From the data input/output unit 123, the main control unit 121 may receive the above-described generation request information, payment information, or transfer information input from the input device 102. Upon receiving such information, the main control unit 121 performs processing to be described below. For example, upon receiving the generation request information, the main control unit 121 adds necessary information thereto, sends it to the data input/output unit 123, and sends it from the data input/output unit 123 to the settlement device 200, via the transmission and reception unit and the network 400.

The display control unit 122 controls images to be displayed on the display 101 under control of the main control unit 121. An image based on the data sent from the display control unit 122 is displayed on the display 101. The main control unit 121 sends an instruction on what image should be displayed on the display 101, to the display control unit 122.

The data input/output unit 123 inputs and outputs data to/from the control unit 120. Specifically, the data input/output unit 123 receives the input from the input device 102. For example, the generation request information, the payment information, or the transfer information is input from the input device 102 to the data input/output unit 123. Such information is sent from data input/output unit 123 to the main control unit 121.

In addition, the data input/output unit 123 receives, from the transmission and reception unit, the virtual currency data sent from the settlement device 200 via the network 400. The data input/output unit 123 sends the received virtual currency data to the main control unit 121.

Further, the data input/output unit 123 may receive the virtual currency data from the main control unit 121. The data input/output unit 123, which has received the virtual currency data, sends the virtual currency data to the transmission and reception unit, and the virtual currency data is sent from the transmission and reception unit to the settlement device 200, for example. A transmission destination of the virtual currency data is designated by the main control unit 121 according to the input from the input device 102, as will be described below.

As described above, when the main control unit 121 receives the virtual currency data from the data input/output unit 123, the user terminal recording unit 124 receives the virtual currency data from the main control unit 121 and records it. When viewed as hardware, the user terminal recording unit 124 is configured by a part of the RAM 113.

In addition, the virtual currency data recorded in the user terminal recording unit 124 may be read by the main control unit 121 at a timing to be described below.

The settlement device 200 will be described below. In this embodiment, the settlement device 200 also serves as a virtual currency data generating device as referred to in the present invention, but is not limited thereto.

The settlement device 200 is a general computer, and in this embodiment, is a general server device in more detail. Hardware configuration thereof may be equivalent to that of a settlement device in the conventional settlement system.

Figure 5:
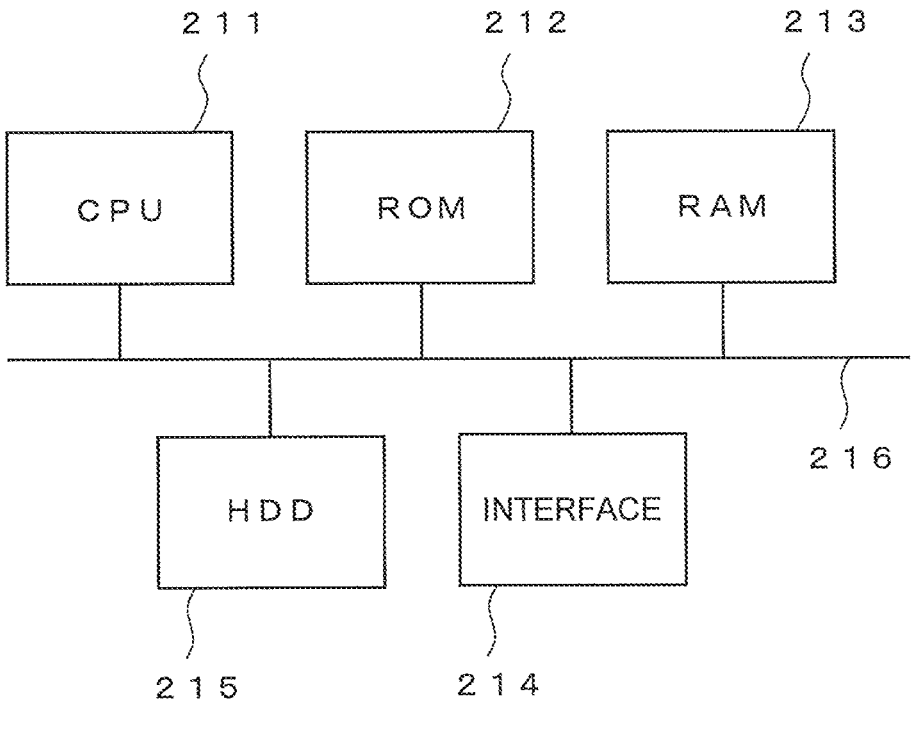
FIG. 5 is a diagram showing a configuration of hardware of a settlement device included in the settlement system shown in FIG. 1.

An example of the hardware configuration of the settlement device 200 is shown in FIG. 5.

The hardware includes a CPU 211, a ROM 212, a RAM 213, an interface 214, and a large-capacity recording medium that is an HDD (hard disk drive) 215 in this embodiment, and these are connected to each other by a bus 216.

The CPU 211 is an arithmetic operation device that performs arithmetic operations. The CPU 211, for example, executes a computer program recorded in the ROM 212 to execute processing to be described below. It should be noted that the computer program used herein includes at least a computer program for causing the settlement device 200 to function as a settlement device of the present invention. The computer program may be pre-installed in the settlement device 200, or may be post-installed. The computer program may be installed in the settlement device 200 via a predetermined recording medium such as a memory card, or may be installed via the network such as the Internet.

The ROM 212 records the computer program and data necessary for the CPU 211 to execute processing to be described below. The computer program recorded in the ROM 212 is not limited thereto, and any other necessary computer programs may be recorded.

The RAM 213 provides a work area necessary for the CPU 211 to perform processing.

The interface 214 performs data exchange between the CPU 211, the RAM 213, and the like connected via the bus 216 and the outside. The interface 214 is at least connected to the transmission and reception unit. The data received by the transmission and reception unit from the network 400 is received by the interface 214, and the data passed from the interface 214 to the transmission and reception unit is sent to the outside, for example, to the user terminal 100 by the transmission and reception unit, via the network 400.

The HDD 215 is a large-capacity recording medium as described above, and records data. At least a part of the computer program or data necessary for the CPU 211 to execute processing to be described below may be recorded on the HDD 215 instead of the ROM 212, and most of the computer program and data is more practically recorded on the HDD 215.

Figure 6:
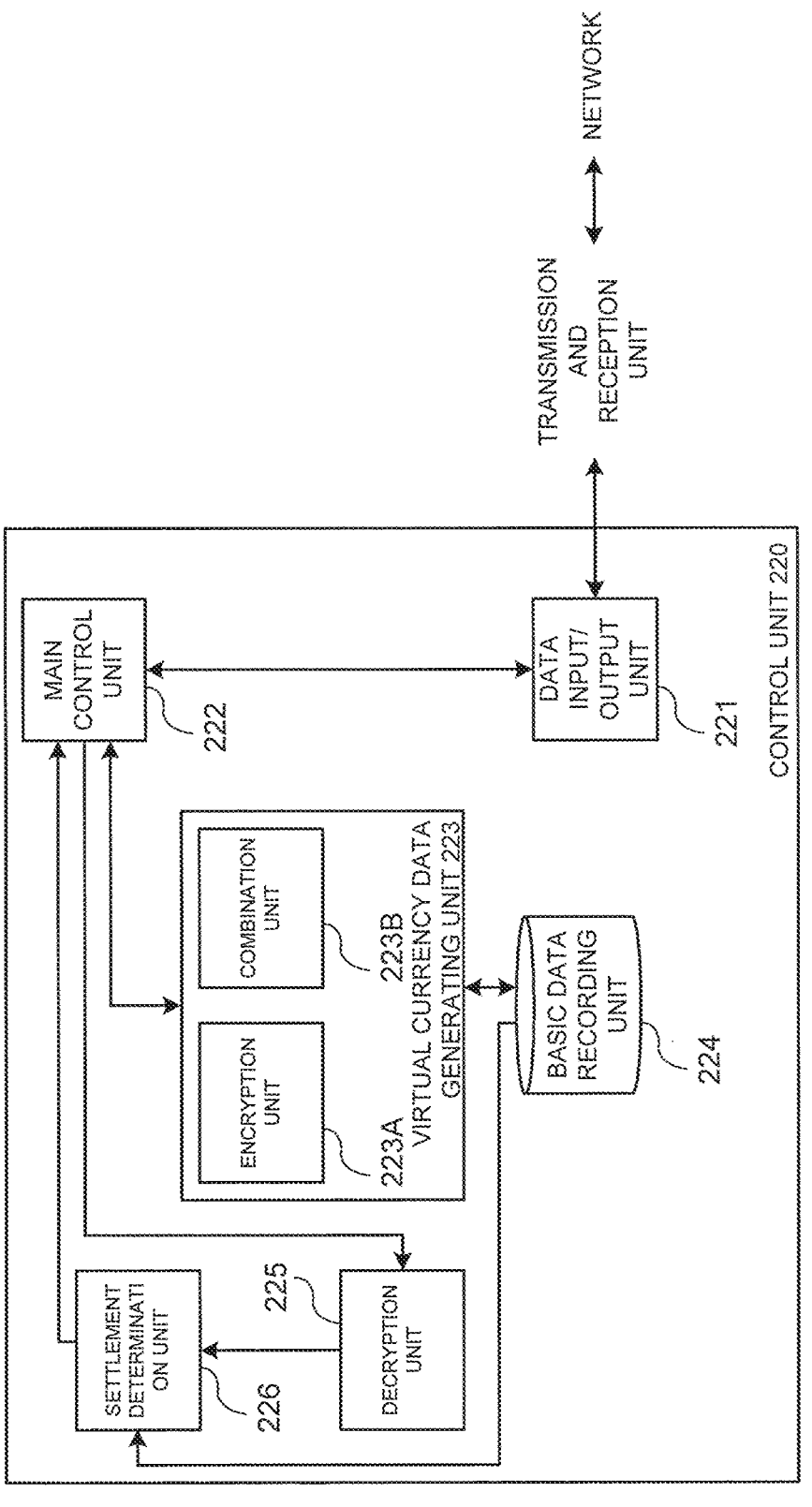
FIG. 6 is a block diagram showing functional blocks generated inside the settlement device included in the settlement system shown in FIG. 1.

Functional blocks as shown in FIG. 6 are generated within the settlement device 200 when the CPU 211 executes the computer program. It should be noted that while the following functional blocks may be generated with functions of the above-described computer program alone for causing the settlement device 200 to function as the settlement device of the present invention, the following functional blocks may be generated in cooperation with the above-described computer program and the OS and other computer programs installed in the settlement device 200.

A control unit 220 to be described below is generated in the settlement device 200 in relation to the functions of the present invention. A data input/output unit 221, a main control unit 222, a virtual currency data generating unit 223, a basic data recording unit 224, a decryption unit 225, and a settlement determination unit 226 are generated in the control unit 220.

The data input/output unit 221 inputs and outputs data to/from the control unit 220. Specifically, the data input/output unit 221 receives various data to be described below, from the main control unit 222.

For example, the data input/output unit 221 receives virtual currency data from the main control unit 222. The received virtual currency data is sent to the transmission and reception unit from the data input/output unit 221, and is sent to the user terminal 100 via the network 400.

The data input/output unit 221 also receives various data to be described below, which are received by the transmission and reception unit from the user terminal 100 or the settlement terminal 300 via the network 400, from the transmission and reception unit, and sends the received data to the main control unit 222. For example, the data input/output unit 221 may receive virtual currency data and generation request information from the transmission and reception unit, and the data input/output unit 221, which has received any one of the virtual currency data and the generation request information, sends any one to the main control unit 222.

The main control unit 222 performs overall control within the control unit 220. For example, the main control unit 222 is configured to perform settlement processing to be described below, and is configured to perform necessary processing by sending data to be described below to the virtual currency data generating unit 223, decryption unit 225, and the like.

As described above, the main control unit 222 may receive the virtual currency data from the data input/output unit 221, and the main control unit 222, which has received the virtual currency data, sends the virtual currency data to the decryption unit 225. In this case, only the virtual currency encryption data among the data included in the virtual currency data may be sent to the decryption unit 225.

As described above, the main control unit 222 may receive the generation request information from the data input/output unit 221, and the main control unit 222, which has received the information, sends the information to the virtual currency data generating unit 223.

The main control unit 222 may also receive final determination data, which will be described below, from the settlement determination unit 226. As will be described below, the final determination data is data indicating whether the settlement is accepted or the settlement is not accepted. Upon receiving the positive final determination data with the content of accepting the settlement which will be described below, the main control unit 222 performs settlement processing. In this embodiment, the settlement processing is a process for accepting payment of money to the settlement terminal 300 that has sent the virtual currency encryption data. The main control unit 222 retains data indicating what kind of payment has been made. For example, the main control unit 222 is configured to cause a recording medium (not shown) for each settlement terminal 300 to record information indicating how much payment is finally permitted to anybody (administrator of any settlement terminal 300, etc.).

On the other hand, upon receiving the negative final determination data, which will be described below, indicating that payment is not accepted, the main control unit 222 does not perform processing for accepting the settlement.

As described above, the virtual currency data generating unit 223 may receive the generation request information from the main control unit 222. Upon receiving the generation request information, the virtual currency data generating unit 223 generates virtual currency data. The virtual currency data generating unit 223 includes an encryption unit 223A and a combination unit 223B. A method of generating the virtual currency data using the virtual currency data generating unit 223 will be described in detail below.

The virtual currency data generating unit 223 uses data recorded in the basic data recording unit 224 when generating the virtual currency data. The virtual currency data generating unit 223 reads and uses necessary data among the data recorded in the basic data recording unit 224 when generating the virtual currency data.

The virtual currency data generating unit 223 sends the generated virtual currency data to the main control unit 222.

Data necessary for generating the virtual currency data is recorded in the basic data recording unit 224. Details of the data recorded in the basic data recording unit 224 will be described below.

As described above, the decryption unit 225 may receive virtual currency data (or virtual currency encryption data) from the main control unit 222.

Upon receiving the virtual currency encryption data, the decryption unit 225 decrypts the received data. Details of the decryption processing will be described below. The decrypted data includes issuer information, amount information, and settlement condition information, all of which will be described in detail below. When being able to decrypt the virtual currency encryption data, the decryption unit 225 sends at least the amount information and the settlement condition information among the issuer information, the amount information, and the settlement condition information to the settlement determination unit 226.

On the other hand, when not being able to decrypt the virtual currency encryption data, the decryption unit 225 notifies the settlement determination unit 226 of the purport thereof.

As described above, at least the amount information and the settlement condition information among the issuer information, the amount information, and the settlement condition information may be sent to the settlement determination unit 226 from the decryption unit 225. Upon receiving these types of information, the settlement determination unit 226 performs a final determination that is a determination as to whether the settlement is accepted or not. As a result, the settlement determination unit 226 generates final determination data that is data including the content of either of acceptance of the settlement or not acceptance of the settlement. As will be described below, the settlement determination unit 226 may use the data recorded in the basic data recording unit 224 when performing such a determination. A method of generating the final determination data using the settlement determination unit 226 will be described below.

As described above, the settlement determination unit 226 may receive the notification that the virtual currency encryption data cannot be decrypted, from the decryption unit 225. Upon receiving the notification, the settlement determination unit 226 generates final determination data including the content of not acceptance of the settlement.

In any case, when generating the final determination data, the settlement determination unit 226 sends it to the main control unit 222.

The settlement terminal 300 will be described below.

The settlement terminal 300 plays the same role as the settlement terminal used in the settlement system using the credit card, and is a general computer. For example, it is assumed that the settlement terminal 300 is configured by a tablet.

The settlement terminal 300 includes a touch panel display (not shown), but an external appearance thereof is not shown because of the same as that in FIG. 2. As a result, the settlement terminal 300 includes a display and an input device. However, the settlement terminal 300 may alternatively include a display that is not a touch panel type and an input device including necessary input devices selected from publicly known or well-known input devices such as a numeric keypad, a keyboard, a mouse, and a trackball, in other words, may include the display and the input device separately. The description will be made below assuming that the settlement system in this embodiment includes a touch panel display.

In addition, the settlement terminal 300 includes a camera (not shown). The camera may be externally attached, but the settlement terminal 300, which is a tablet, includes a publicly known built-in camera.

Figure 7:
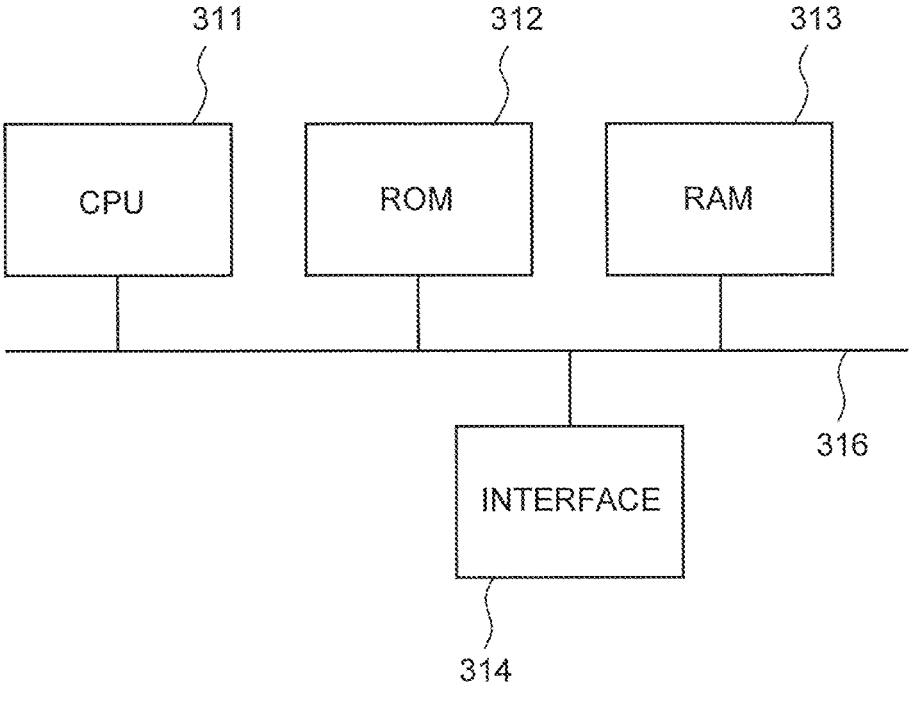
FIG. 7 is a diagram showing a configuration of hardware of a settlement terminal included in the settlement system shown in FIG. 1.

A configuration of hardware of the settlement terminal 300 is shown in FIG. 7.

The hardware includes a CPU 311, a ROM 312, a RAM 313, and an interface 314, which are interconnected by a bus 316.

The CPU 311 is an arithmetic operational device that performs arithmetic operations. The CPU 311, for example, executes a computer program recorded in the ROM 312 to execute processing to be described below. The computer program may be pre-installed in the settlement terminal 300, or may be post-installed. The computer program may be installed in the settlement terminal 300 via a predetermined recording medium such as the memory card, or may be performed via a network such as the LAN or the Internet.

The ROM 312 records the computer program and data necessary for the CPU 311 to execute processing to be described below, in other words, for causing the computer to function as a transmission device according to the present invention. The computer program recorded in the ROM 312 is not limited thereto, and any other necessary computer programs may be recorded.

The RAM 313 provides a work area necessary for the CPU 311 to perform processing.

The interface 314 performs data exchange between the CPU 311, the RAM 313 and the like connected via the bus 316 and the outside. The Interface 314 is at least connected to the transmission and reception unit which is not shown. The transmission and reception unit may be connected to the network 400 to at least transmit data via the network 400, but is configured to transmit and receive data via the network

400 in this embodiment. The data passed to the transmission and reception unit from the interface 314 is sent to the outside, for example, to the settlement device 200 by the transmission and reception unit, via the network 400. The data output from the interface 314 and transmitted from the transmission and reception unit is mainly virtual currency data in relation to this embodiment.

The interface 314 is also connected to the input device provided on the touch panel display so as to accept an input from the input device. The interface 314 is connected to the touch panel display so as to send data for displaying an image to be described below, to the touch panel display. The data input from the input device to the interface 314 is, for example, data instructing the start of payment, a settlement terminal ID to be described below, and the like.

The interface 314 is also connected to the camera described above. Image data including an image for specifying the virtual currency data is input from the camera to the interface 314. The virtual currency data is actually input to the interface 314 from the camera, which is slightly inaccurate.

The hardware may include a large-capacity recording medium, and the function at this time is as described above.

Figure 8:
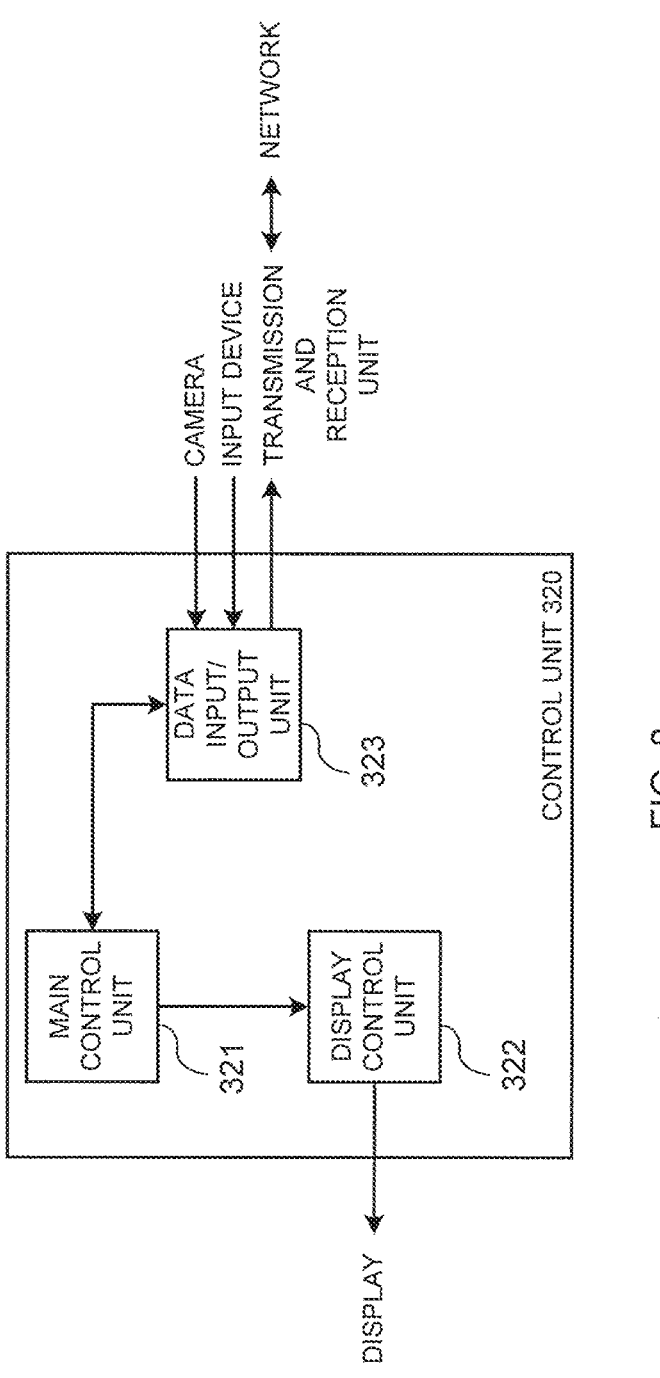
FIG. 8 is a block diagram showing functional blocks generated inside the settlement terminal included in the settlement system shown in FIG. 1.

Functional blocks as shown in FIG. 8 are generated within the settlement terminal 300 when the CPU 311 executes the computer program. It should be noted that the following functional blocks may be generated with functions of the above-described computer program alone for causing the settlement terminal 300 to function as the settlement terminal of the present invention, the following functional blocks may be generated in cooperation with the above-described computer program and the OS and other computer programs installed in the settlement terminal 300.

A control unit 320 to be described below is generated in the settlement terminal 300 in relation to the functions of the present invention, and a main control unit 321, a display control unit 322, and a data input/output unit 323 are generated in the control unit 320.

The control unit 320 executes information processing as will be described below.

The main control unit 321 performs overall control within the control unit 320. For example, the main control unit 321 controls the display control unit 322 based on data received from the data input/output unit 323 to be detailed below.

The main control unit 321 is configured to receive virtual currency data from the data input/output unit 323 to be described below. The main control unit 321 of each settlement terminal 300 records a unique settlement terminal ID for each settlement terminal 300. The main control unit 321 attaches data of the settlement terminal ID to the received virtual currency data and sends it to the data input/output unit 323.

The display control unit 322 controls the images to be displayed on the above-described display of the touch panel type under control of the main control unit 321. An image based on the data sent from the display control unit 322 is displayed on the display. The main control unit 321 sends an instruction on what image should be displayed on the display, to the display control unit 322.

The data input/output unit 323 inputs and outputs data to/from the control unit 320.

Specifically, the data input/output unit 323 receives the input from the input device and sends it to the main control unit 321. An example of data input from the input device to the data input/output unit 323 is data for instructing the start of settlement. In addition, the settlement terminal ID described above may be input. Further, image data including the virtual currency data captured by the camera may be input to the data input/output unit 323.

Moreover, the data input/output unit 323 outputs the data to the transmission and reception unit, which is not shown. The data output to the transmission and reception unit is the virtual currency data sent from the main control unit 321. The settlement terminal ID is attached to the virtual currency data. The data output to the transmission and reception unit is transmitted to the settlement device 200 from the transmission and reception unit via the network 400.

Figure 9:
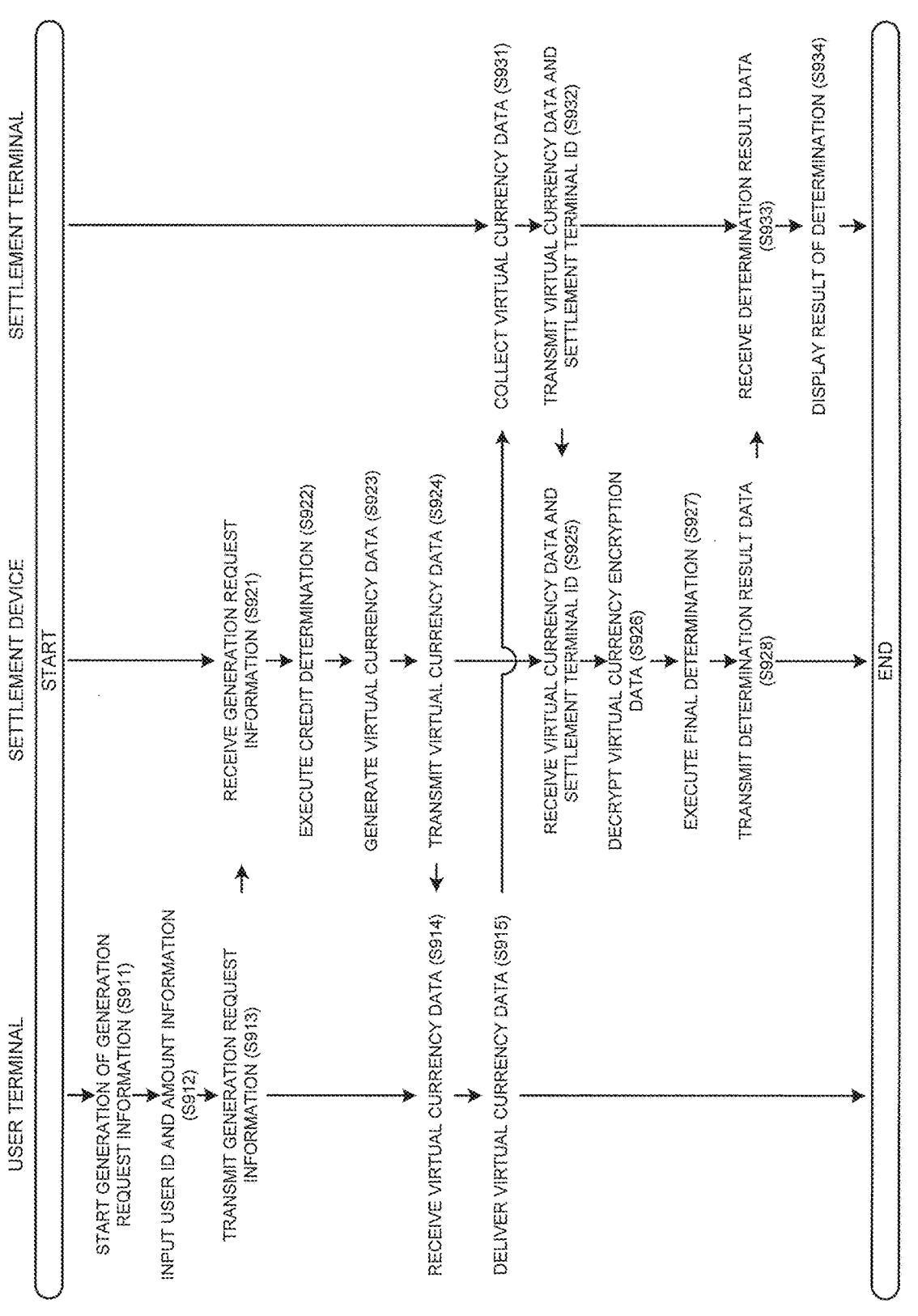
FIG. 9 is a diagram showing a flow of a process to be executed at the time of settlement on the settlement system shown in FIG. 1.

A method of using the settlement system as described above and an operation thereof will be described below with reference to FIG. 9.

First, as preparation for using such a system, a user ID is set in each of the user terminals 100 and a settlement terminal ID is set in each of the settlement terminals 300.

The user ID is an ID unique to each of the user terminals 100 for identifying each of the user terminals 100, and is generally an enumeration of alphabetic characters, numbers, and symbols. The same also applies to the settlement terminal ID. In order to avoid duplication of a large number of user IDs, the settlement device 200 may issue a user ID to each of the user terminals 100. The same also applies to the settlement terminal ID. Alternatively, an individual identification number embedded in the hardware of the user terminal 100 from the time of shipment can be used as the user ID. The same also applies to the settlement terminal ID.

The administrator of each of the user terminal s 100 inputs the user ID for the user terminal 100 by operating the input device. Note that such an input is not necessary when the individual identification number is used as the user ID.

Data of the user ID is sent from the input device to the interface 114 and sent from the interface 114 to the control unit 120. The data input/output unit 123 of the control unit 120 receives the data and sends it to the main control unit 121. The main control unit 121 retains the data, or records it in the main control unit 121.

On the other hand, the main control unit 121 sends the user ID data to the data input/output unit 123. The user ID data is sent from the data input/output unit 123 to the transmission and reception unit, and then sent to the settlement device 200 via the network 400.

The settlement device 200 receives the user ID data at the transmission and reception unit. The user ID data is sent from the transmission and reception unit to the interface 214 and is sent from the interface 214 to the control unit 220. The data input/output unit 221 of the control unit 220 receives the data, and sends it to the main control unit 222. The main control unit 222 retains the data, or records it in the main control unit 222. When all the user terminals 100 perform this processing, the main control unit 222 has a list of all the user terminals 100. Using such a list, the settlement device 200 specifies that the virtual currency data is generated for anybody (who owns any user terminal 100).

The administrator of each of the settlement terminals 300 inputs the settlement terminal ID for the settlement terminal 300 by operating the input device. Data of the settlement terminal ID is sent from the input device to the interface 314, and then is sent from the interface 314 to the control unit 320. The data input/output unit 323 of the control unit 320 receives the data and sends it to the main control unit 321. The main control unit 321 retains the data, or records it in the main control unit 321.

On the other hand, the main control unit 321 sends the data of the settlement terminal ID to the data input/output unit 323. The data of the settlement terminal ID is sent from the data input/output unit to the transmission and reception unit, and is sent to the settlement device 200 via the network 400.

The settlement device 200 receives the data of the settlement terminal ID at the transmission and reception unit. The data of the settlement terminal ID is sent from the transmission and reception unit to the interface 214, and is sent from the interface 214 to the control unit 220. The data input/output unit 221 of the control unit 220 receives the data and sends it to the main control unit 222. The main control unit 222 retains the data, or records it in the main control unit 222. When all the settlement devices 200 perform this processing, the main control unit 222 has a list of all the settlement terminals 300. Using such a list, the settlement device 200 specifies that payment (settlement) is accepted for anybody (administrator of any settlement terminal 300).

First, the virtual currency data is generated.

Although not limited thereto, in this embodiment, generation of the virtual currency data starts from a point where the user starts generation of generation request information (S911).

In order to start the generation of the generation request information, for example, the user may touch an icon (not shown) displayed on the display 101. Then, the operation content is sent from the input device 102 to the main control unit 121 via the interface 114 and the data input/output unit 123, and the generation of the generation request information is started.

The generation request information is generated when the user operates the input device 102 of the user terminal 100. The generation request information includes at least a user ID and an amount of money that the user intends to use for payment.

When the generation of the generation request information is started, the main control unit 121 sends an instruction to the display control unit 122 to display an image for urging the user to input the user ID or the like on the display 101. The display control unit 122, which has accepted this instruction, displays, on the display 101, an image for urging the user to input the user ID and the amount of money for which the user intends to perform the payment, as shown in FIG. 10(A), for example. The user inputs the user ID on the right side of a field indicated as "User ID", and inputs the amount of money for which the user intends to pay on the right side of a field indicated as "Amount of money (yen)", respectively (S912). Data on the user ID and the amount information, which is information for specifying the amount of money, input by the user is input from the input device 102 to the data input/output unit 123 via the interface 114, and sent to the main control unit 121. Since the user ID and the amount information, which are input by the user, are displayed on the display 101, also including during the input, under control of the display control unit 122 controlled by the main control unit 121, the user can input the user ID and the amount information while checking the display 101. According to an example shown in FIG. 10(B), the user intends to pay 25,000 yen using this settlement system.

When the input of the user ID and the amount information is completed, the user clicks a button of "Decision" displayed on the display 101.

When the user clicks the button of "Decision", the user ID and the amount information are sent from the data input/output unit 123 to the main control unit 121. The main control unit 121 collects the user ID and the amount information to use it as generation request information.

The generation request information may include other types of information. Although not limited thereto, in this embodiment, for example, the user can input, from the input device 102, data (time information) indicating that the settlement period is limited to a predetermined period, by inputting the purport when the user intends to limit the settlement period to a predetermined period (for example, payment should be made due to the data only within half a year after the virtual currency data is issued, or the usable date of the virtual currency data is specified at the start and end), and data (recipient information) indicating that a recipient of payment is limited to a specific person when the user intends to limit the recipient of payment to a specific person (it is not necessarily one person. For example, it is also possible to target multiple persons being in a specific chain store, the head office and all branch offices of a corporation that operates a specific banking business, and a store that opens a certain shopping mall). These data are used when settlement condition information to be described below is generated by the settlement device 200. Similarly to the data of the user ID, these data are input from the input device 102 to the data input/output unit 123 via the interface 114, and is passed to the main control unit 121 from the data input/output unit 123. When these data are input, the main control unit 121 adds the data to the user ID and the settlement terminal ID to use as generation request information.

The generation request information is sent from the main control unit 121 to the data input/output unit 123, and is sent from the data input/output unit 123 to the transmission and reception unit. The generation request information is sent from the transmission and reception unit to the settlement device 200 via the network 400 (S913).

As in the case hereinafter, all communications performed via the network 400 in this embodiment may be encryption communications. Techniques used for encryption and decryption in this case can be publicly known or well-known.

The settlement device 200 accepts the data of the generation request information at the transmission and reception unit (S921). The transmission and reception unit sends the data of the generation request information to the data input/output unit 221, and the data input/output unit 221 sends the data to the main control unit 222.

Although not necessarily limited to this, the main control unit 222 in this embodiment performs credit determination, which is determination as to whether virtual currency data may be generated with respect to the user terminal 100 specified by the user ID (S922). Such determination may be performed in the same manner as a procedure generally called credit determination. As will be described below, if there is no particular problem, the settlement device 200 issues virtual currency data to the user terminal 100, but since the virtual currency data is data having a monetary value, determination as to whether such data may be issued to the user, who has sent the generation request information, is performed.

For example, the main control unit 222 can communicate with a deposit account database for each user in which the balance of the amount of money deposited from each user is recorded in association with the user ID of each user, and may determine that the credit of the user is accepted when the balance is larger than the amount of money specified by the amount information, which is transmitted in a state of being included in the generation request information from the user. The main control unit 222 can communicate with each bank having a bank account designated by each user, and may determine that the credit of the user is accepted when the balance of the bank account designated by the user is larger than the amount of money specified by the amount information, which is transmitted in a state of being included in the generation request information from the user. Alternatively, when the user terminal 100 sends the generation request information to the settlement device 200, the settlement device 200 may urge the user, who operates the user terminal 100 that has sent the generation request information, to pay the amount of money specified by the amount information transmitted in a state of being included in the generation request information; and when it is checked that the user has paid the amount of money to the administrator of the settlement device 200 with a credit card from the user terminal 100, for example, the main control unit 222 of the settlement device 200 may determine that the credit of the user is accepted. Alternatively, as in the credit determination in the payment with the credit card, when the amount of money specified by the amount information transmitted in a state of being included in the generation request information from the user is within a credit limit which is determined in advance depending on the user's occupation, annual income, own house, etc., the main control unit 222 may determine that the credit of the user is accepted.

In any case, the main control unit 222 sends the amount information, which is included in the generation request information sent from the user, when the credit of the user is accepted and the data necessary for generating the settlement condition information if existing to the virtual currency data generating unit 223.

The virtual currency data generating unit 223, which has received the amount information and the like, generates virtual currency data (S923).

The virtual currency data includes at least issuer information, amount information, and settlement condition information all of that are in encrypted condition. Further, as described above, the virtual currency data generating unit 223 uses the data recorded in the basic data recording unit 224 when generating the virtual currency data. In order to describe a method of generating the virtual currency data, first, the data recorded in the basic data recording unit 224 will be described.

The data recorded in the basic data recording unit 224 in this embodiment is information that can be issuer information and settlement condition information. As will be described below, the issuer information may include the data not recorded in the basic data recording unit 224, and the same also applies to the settlement condition information.

The issuer information is generally information indicating circumstances of issue including the issuer of the virtual currency data. The information capable of being the issuer information is, for example, issuer information, which is information for specifying the settlement device 200 being an issuer of the virtual currency data, and is, for example, an IP address of the settlement device 200. Note that a sender of the generation request information can be an issuer, and, in this case, the issuer information is an IP address of the user terminal 100. Another example of information that can be issuer information is authentication information that is issued by a person who has the authority to guarantee authenticity of the virtual currency data, for example, a government organization and is information for guaranteeing the authenticity of the virtual currency data. Still another example of information that can be issuer information is serial number information that is information unique to each virtual currency data for distinguishing the virtual currency data from other virtual currency data. The issuer information may include another information, or may include data that is not recorded in the basic data recording unit 224 as will be described below. Of these, what is essential is only information for specifying the issuer of the virtual currency data (in this embodiment, it is assumed to be settlement device 200.). Further, information other than the authentication information and the serial number information may be recorded in the basic data recording unit 224, as information that can be the issuer information.

The serial number information described above will be complementally described. The serial number information is information on the serial number. For example, banknotes issued by the Japanese government (or the Bank of Japan) are recorded with serial numbers that are enumerated by numbers and alphabets. Similarly, in order to distinguish between the previously issued virtual currency data and the newly issued virtual currency data, each virtual currency data may include serial number information in an encrypted state. The serial number information is, for example, a serial number of a multi-digit number starting from 1 (for example, 1,000-digit number) represented in hexadecimal notation as in the serial number printed on banknotes issued by the Japanese government. The basic data recording unit 224 is recorded with, as the serial number information, the serial number information next to the serial number information included in the virtual currency data issued immediately before. The serial number information is rewritten as will be described below.

The settlement condition information is information that becomes a condition for causing the settlement device 200, which has received the virtual currency data, to accept the settlement as will be described below. The settlement condition determined by the settlement condition information may be determined by the user terminal 100 or the settlement device 200. The settlement condition information determined by the settlement device 200 is recorded in the basic data recording unit 224.

For example, as described above, recipient information or time information is recorded in the basic data recording unit 224, as information that can be the settlement condition information. However, if the settlement condition information set by the settlement device 200 is difficult for the user to use the virtual currency data for payment, the use of the virtual currency data becomes difficult, so that it is important to set the settlement condition information that will be beneficial for the user. The settlement condition information may also be information for changing the amount of money specified by the amount information. Specifically, the settlement condition information can be information for gradually reducing the amount of money specified by the amount information with the passage of time or reducing the amount of money specified by the amount information in a step-by-step manner with the passage of time. The settlement condition information can be information that the amount of money specified by the amount information is increased by 10% when being on payment to a recipient belonging to a certain store or a certain corporate group, or a recipient who has an address in a certain region, in other words, a recipient having a certain attribute, for example, within a designated period. The final example includes a case in which a user can use the virtual currency data like a coupon.

The basic data recording unit 224 is also recorded with data required when the settlement device 200 performs settlement determination to be described below. Since the data is used by the settlement determination unit 226 rather than by the virtual currency data generating unit 223, the data is not necessarily recorded in the basic data recording unit 224 as much as possible. Although not limited thereto, in this embodiment, the settlement terminal ID for each settlement terminal 300, the position (for example, its latitude and longitude) where each settlement terminal 300 exists, and the attribute (indicating which corporate group it is included to or which shopping mall it is resident in, for example) of each settlement terminal 300 are recorded as shown in FIG. 11.

The virtual currency data generating unit 223, which has received the amount information or the like, reads the information that can be the issuer information and the settlement condition information recorded in the basic data recording unit 224 when generating the virtual currency data. Data (see FIG. 12(A)) obtained by combination of the issuer information, the amount information, and the settlement condition information (although not necessarily in this order) is generated.

The issuer information in this embodiment includes information for specifying the settlement device 200 that is the issuer of the virtual currency data, authentication information, serial number information, and timing information, but is not limited thereto. When reading the serial number information, the virtual currency data generating unit 223 overwrites the serial number information recorded in the basic data recording unit 224 with "+1". Thus, the serial number information is always kept up-to-date. In addition, the timing information indicates a time at which the virtual currency data generating unit 223 generates such virtual currency data (for example, a time at which the virtual currency data generating unit 223 receives the amount information or the like) in units of seconds, for example. In order to make this, the virtual currency data generating unit 223 always receives date and time information from a clock (not shown) included in the settlement device 200.

In this embodiment, the amount information is information for specifying the amount of money of 25,000 yen as described above. Naturally, the amount of money is not limited to 25,000 yen, and the unit of money is not limited to yen. Furthermore, the unit of money need not be the same as the legal currency.

In this embodiment, the settlement condition information is included in the generation request information sent from the user terminal 100, and indicates various conditions specified by the data necessary for generating the settlement condition information sent from the main control unit 222 to the virtual currency data generating unit 223 and the data necessary for generating the settlement condition information recorded in the basic data recording unit 224.

Then, data shown in FIG. 12(A) is encrypted by the encryption unit 223A in the virtual currency data generating unit 223 and converted into virtual currency encryption data. The encryption method may be publicly known or well-known, but it is necessary to able to perform decryption by at least an appropriate method in this embodiment.

The virtual currency data generating unit 223 sequentially generates virtual currency data according to a large number of requests from a large number of users. For the sake of description, it is assumed that the encrypted portion of the data structure is subjected to shading. Although not limited thereto, in this embodiment, the encryption method executed in the process of generating the virtual currency data is also applied to a case of generating any virtual currency data. In this embodiment, the encryption method is applied even in the case of generating any virtual currency data by making the algorithm and key used to encryption unchanged.

By the way, as described above, in this embodiment, the data to be encrypted includes serial number information and timing information on the premise that the content is changed. In particular, there is no same serial number information. Therefore, there is also no same virtual currency encryption data. The virtual currency encryption data is formed by alphabetic characters, numbers, symbols, or a combination of two or more thereof, and is enumerated by characters having a certain number of characters (for example, 1,000-digit number) or more (or the number of digits).

When the encryption unit 223A generates the virtual currency encryption data, the virtual currency encryption data is sent to the combination unit 223B. The combination unit 223B combines a predetermined one of issuer information, amount information, and settlement condition information (These are encrypted in the virtual currency encryption data.) included in the virtual currency encryption data with the virtual currency encryption data in plaintext. Virtual currency data is obtained by combining the above-described data with the virtual currency encryption data. Information added to the virtual currency encryption data may be a part or all of the issuer information, the amount information, and the settlement condition information, but is the serial number information, the amount information, and the recipient information in this embodiment as shown, e.g., in FIG. 12(B).

The content of the serial number information, the amount information, and the recipient information in plaintext can be grasped not only by the settlement device 200 but also by the user terminal 100 or the settlement terminal 300 without any special processing (because of being readable, the content is understood by reading). When a malicious third party obtains the virtual currency data, the malicious third party can also read the plaintext data, but cannot grasp all the contents of the data that is encrypted and included in the virtual currency encryption data, so that the malicious third party is difficult to misuse the virtual currency data. For example, when the malicious third party requests the settlement device 200 to make a settlement via the settlement terminal 300 as will be described below under conditions against the encrypted settlement condition information attached to the virtual currency encryption data, the malicious third party follows the specification of the settlement device 200 or the settlement terminal 300, but may leave a history of requesting the settlement device 200 or the settlement terminal 300 to make the settlement under wrong conditions. Such a history is a powerful evidence for identifying the malicious third party, and is a powerful force that prevents the malicious third party from misusing the virtual currency data.

The generated virtual currency data is sent from the virtual currency data generating unit 223 to the main control unit 222. The main control unit 222 instructs the user terminal 100, which is specified by the user terminal ID attached to the generation request information serving as an application for generating the virtual currency data, to return the virtual currency data, and sends the virtual currency data to the data input/output unit 221. The virtual currency data is further sent to the transmission and reception unit and sent to the user terminal 100 specified by the user terminal ID, via the network 400 (S924).

The transmission and reception unit of the user terminal 100 receives the sent virtual currency data (S914). The received virtual currency data is sent from the data input/output unit 123 to the main control unit 121.

The virtual currency data can be used in this state. That is, the user, an owner of the user terminal 100, can pay to a third party using the virtual currency data. The user performs an operation for preserving the virtual currency data using the input device 102. Then, the operation content of the purport is sent from the input device 102 to the main control unit 121 via the interface and the data input/output unit 123. The virtual currency data is sent from the main control unit 121 to the user terminal recording unit 124, and is recorded in the user terminal recording unit 124 that is a part of the RAM 113 when viewed as hardware. The same user can naturally store a plurality of virtual currency data in his/her user terminal 100. In this case, the plurality of virtual currency data is recorded in the user terminal recording unit 124.

The user can use the virtual currency data preserved in the user terminal 100 for payment at any time. When the user wants to use the virtual currency data, the user operates the input device 102 of the user terminal 100 to input the purport. Such an input is input to the main control unit 121 via the interface 114 and the data input/output unit 123. Upon receiving the input, the main control unit 121 reads, for example, all the virtual currency data from the user terminal recording unit 124, and, based on the data, instructs the display control unit 122 to display the image as shown in FIG. 13.

Figure 13:
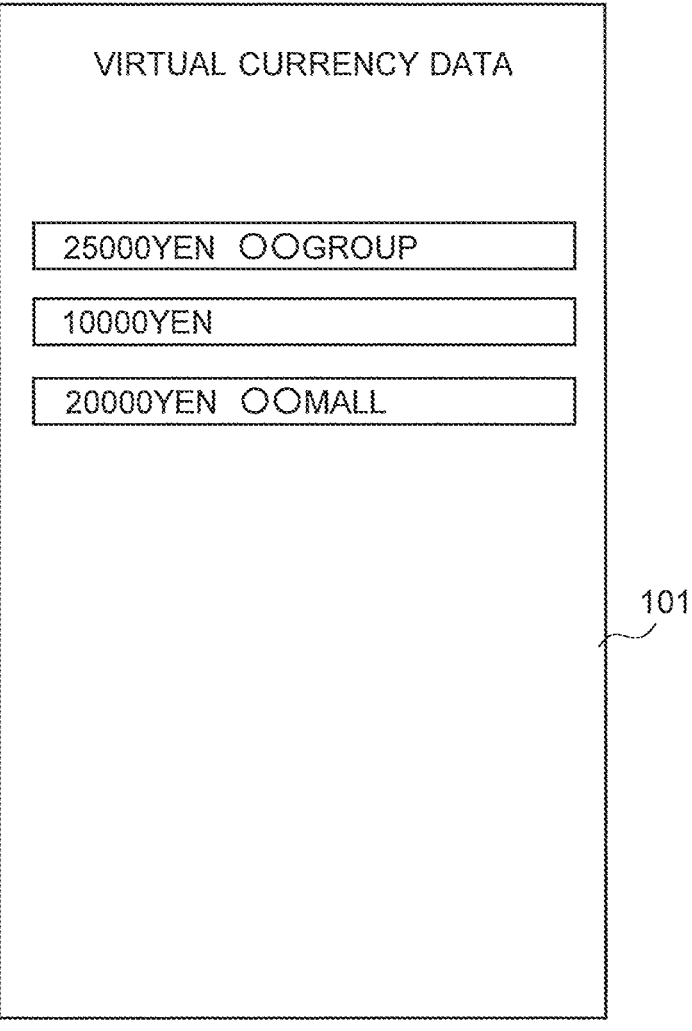
FIG. 13 is a diagram showing another example of an image displayed on the display of the user terminal included in the settlement system shown in FIG. 1.

As shown in FIG. 13, the plurality of virtual currency data is displayed on the display 101 so that one of them can be selected. The displays including the amount of money surrounded by a square frame correspond to the virtual currency data, respectively. As described above, the data of the virtual currency data is recorded with the encrypted virtual currency encryption data and the respective plaintext serial number information, amount information, and recipient information. Since the user terminal 100 can read plaintext information, the user terminal 100 can display information based on the information described in plaintext on the display 101, as an image corresponding to each virtual currency data. In this embodiment, although not limited thereto, the amount of money specified by the amount information and the information on the recipient who can receive payment based on the recipient information are displayed on the display 101. The virtual currency data, which is not displayed based on the recipient information, has no restriction on the recipient. Note that the image displayed on the display 101 can include all of the data described in plaintext, and, for example, may include serial number information.

Figure 14:
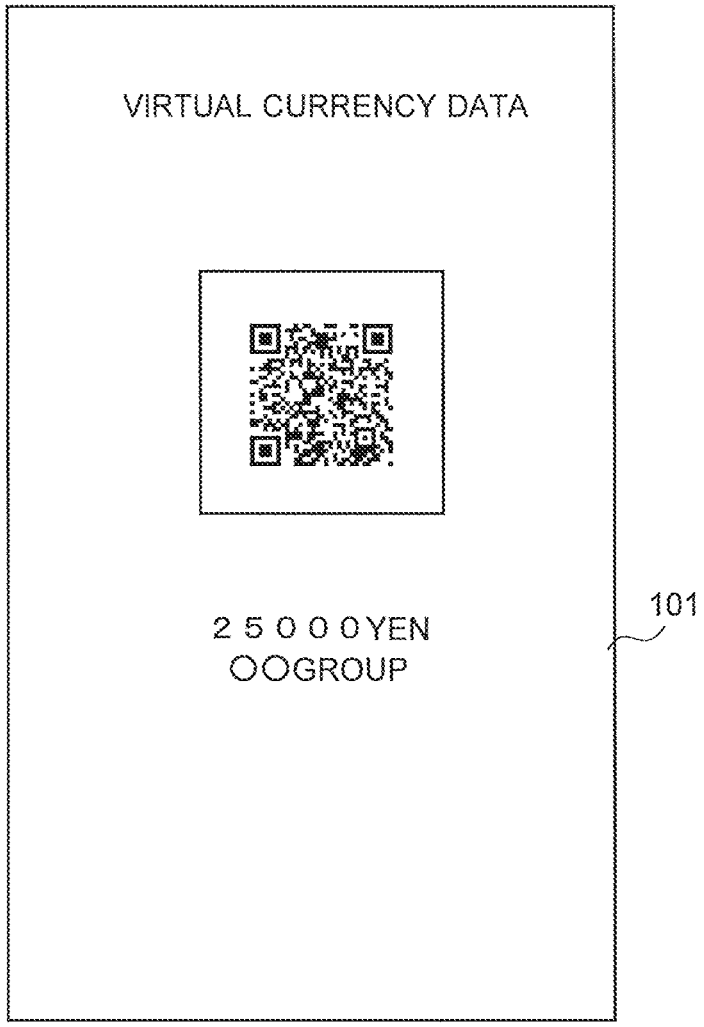
FIG. 14 is a diagram showing further another example of an image displayed on the display of the user terminal included in the settlement system shown in FIG. 1.

The user operates the input device 102, which is one of functions of the display 101, to select virtual currency data used for payment. Such an input is input to the main control unit 121 as described above. Then, the display on the display 101 is switched as shown in FIG. 14. Under the control of the main control unit 121, the display control unit 122 displays on the display 101 a display corresponding to the virtual currency data, and more specifically, a display obtained by converting the virtual currency data into a two-dimensional barcode. Information included in such a two-dimensional barcode needs to correspond to the virtual currency encryption data at a minimum, but, in this embodiment, is assumed to correspond to the entire virtual currency encryption data.

The user is a counterpart who makes payment, and delivers the virtual currency data from the user terminal 100 to the settlement terminal 300 managed by a clerk of a store, for example (S915).

The virtual currency data is delivered by capturing the image of the two-dimensional barcode displayed on the display 101 of the user terminal 100 with a camera provided in the settlement terminal 300. The captured image data is sent from the camera of the settlement terminal 300 to the data input/output unit 323 via the interface 314 and then sent from the data input/output unit 323 to the main control unit 321. The main control unit 321 generates virtual currency encryption data from the two-dimensional barcode reflected in the image data. Thereby, the virtual currency data is delivered from the user terminal 100 to the settlement terminal 300 (S931).

The virtual currency data is delivered from the user terminal 100 to the settlement terminal 300 by reading of the two-dimensional barcode in this embodiment, but the virtual currency data may be delivered using not only the two-dimensional barcode but also a one-dimensional barcode or another identifier. Furthermore, the virtual currency data is not required to be delivered from the user terminal 100 to the settlement terminal 300 by reading of such an identifier, and may be delivered by Bluetooth (trademark) or another communication. In an extreme case, the virtual currency data may be delivered in a manner that the user verbally tells to the administrator or the like of the settlement terminal 300 or the virtual currency data is displayed on the display 101 and shown to the administrator or the like of the settlement terminal 300. In this case, the administrator or the like of the settlement terminal 300 may input the virtual currency data to the settlement terminal 300 by manually inputting the data using the input device, for example.

In any case, the main control unit 321 temporarily records the virtual currency data, for example, at least until payment due to the virtual currency data is completed. Such recording is performed on the RAM 313 as hardware. As described above, the settlement terminal 300 can read serial number information, amount information, and recipient information described in plaintext in the virtual currency data. Accordingly, the main control unit 321 can cause the display control unit 322 to display the information (shown in FIG. 14), which is specified by these types of information, on the display. For example, the administrator or the like of the settlement terminal 300 can check the amount of payment to be expected by displaying the amount of money specified by the amount information, and can know whether the administrator is a person who can receive the payment by the information specified by the recipient information. When the payment is inappropriate, the administrator or the like of the settlement terminal 300 may receive other virtual currency data from the user.

When the virtual currency data received from the user is appropriate, the administrator or the like of the settlement terminal 300 operates the input device of the settlement terminal 300 to perform an operation for sending the virtual currency data to the settlement device 200.

When such an operation is performed, the operation content is sent from the input device to the main control unit 321 via the data input/output unit 323. When the operation content is input, the main control unit 321 sends data, which is obtained by imparting the settlement terminal ID to the virtual currency data, to the data input/output unit 323. The data input/output unit 323 sends the data to the transmission and reception unit, and the transmission and reception unit sends the data to the settlement device 200 via the network 400 (S932). At this time, at least virtual currency encryption data needs to be sent to the settlement device 200 together with the settlement terminal ID, but in this embodiment, the entire virtual currency data is sent to the settlement device 200 together with the settlement terminal ID.

The settlement device 200 receives the data of the settlement terminal ID and the virtual currency data at the transmission and reception unit (S925). These data are sent to the main control unit 222 via the interface 214 and the data input/output unit 221.

The main control unit 222, which has received such data, sends the data of the settlement terminal ID and the virtual currency data to the decryption unit 225. At this time, at least the virtual currency encryption data needs to be sent to the decryption unit 225 together with the settlement terminal ID, but the entire virtual currency data is sent to the decryption unit 225 together with the settlement terminal ID in this embodiment.

The decryption unit 225 decrypts the virtual currency encryption data (S926). As described above, since the encryption unit 223A performs the same encryption processing on all the virtual currency encryption data, the decryption unit 225 also performs the same decryption processing corresponding to the encryption processing. When the virtual currency encryption data is decrypted, the encrypted issuer information, amount information, and settlement condition information are returned in the form of plaintext. The decryption unit 225 sends the issuer information, the amount information, and the settlement condition information to the settlement determination unit 226 together with the data of the settlement terminal ID.

In this embodiment, due to the fact that the virtual currency encryption data can be decrypted by the decryption unit 225, it is possible to temporarily determine that the virtual currency encryption data and the virtual currency data including the virtual currency encryption data are authentic. When the decryption of the virtual currency encryption data cannot be performed, information indicating the purport thereof is sent to the settlement determination unit 226 from the decryption unit 225.

The settlement determination unit 226 receives the issuer information, the amount information, the settlement condition information, and the settlement terminal ID, or information indicating that the decryption of the virtual currency encryption data cannot be performed, from the decryption unit 225.

Upon receiving the issuer information, the amount information, the settlement condition information, and the settlement terminal ID among the information, the settlement determination unit 226 executes a final determination (S927). In a case of executing the final determination, the settlement determination unit 226 reads necessary data from the basic data recording unit 224.

As described above, the issuer information includes the information for specifying the settlement device 200 that is the issuer of the virtual currency data. Since the same data is recorded in the basic data recording unit 224, the settlement determination unit 226 reads the data from the basic data recording unit 224, and compares with both data. When both data coincide with each other, the settlement determination unit 226 determines that the virtual currency encryption data is authentic.

As described above, the issuer information may include the authentication information that is issued by a person who has the authority to guarantee authenticity of the virtual currency data, for example, a government organization. When such data is used for authentication, since data for authentication also exists in the basic data recording unit 224, the settlement determination unit 226 reads the data from the basic data recording unit 224, and compares both data for authentication with each other. When both data for authentication coincide with each other, the settlement determination unit 226 determines that the virtual currency encryption data is authentic.

Similarly, the serial number information, the timing information, the amount information, the information included in the settlement condition information and the like may be used to determine the authenticity of the virtual currency encryption data, but when it can be determined that the virtual currency data is authentic depending on the determination of the authenticity of the virtual currency encryption data, the settlement determination unit 226 subsequently determines whether the condition specified by the settlement condition information is satisfied. However, since the confirmation that the virtual currency encryption data is authentic is actually performed by the fact that the virtual currency encryption data can be decrypted by the decryption unit 225, the confirmation of the authenticity of the virtual currency encryption data may be omitted herein.

The determination as to whether the condition specified by the settlement condition information is satisfied is performed as follows, for example.

As described above, the settlement condition information may include the recipient information. The recipient information is information for restricting a person who can receive payment depending on the attribute of the recipient or the address of the recipient. The settlement determination unit 226 reads information, from the basic data recording unit 224, on the attribute or the like associated with the settlement terminal ID received from the decryption unit 225, and determines whether the attribute or the like associated with the settlement terminal ID satisfies the condition of a person who can receive payment specified by the recipient information included in the settlement condition information. When such a condition is satisfied, the settlement determination unit 226 temporarily determines that the condition specified by the settlement condition information is satisfied.

The settlement condition information may include the time information as described above. The time information is information for specifying a time when payment from the user to the administrator of the settlement terminal 300 is accepted. The time information may be described by an absolute date and time, for example, from 0:0 on Jul. 1, 2017 to 0:0 on Jul. 30, 2017, depending on the date and time. In such a case, the settlement determination unit 226 may receive information related to the date and time from a clock (not shown) provided in the settlement device 200, and may determine whether the determination time satisfies a condition specified by the time information. When such a condition is satisfied, the settlement determination unit 226 temporarily determines that the condition specified by the settlement condition information is satisfied. On the other hand, the time information may be relatively determined based on a generation time of the virtual currency data, for example, payment is accepted within three months after the virtual currency data is generated or only within 10 days from one week after the virtual currency data is generated. In such a case, the settlement determination unit 226 is required to include the timing information in the decrypted issuer information, but may determine, based on the generation time of the virtual currency data specified by the timing information, whether the above-described condition is satisfied. When such a condition is satisfied, the settlement determination unit 226 temporarily determines that the condition specified by the settlement condition information is satisfied.

The settlement condition information also determines as to a case of information for changing the amount of money specified by the amount information using the same method whether the condition specified by the settlement condition information is satisfied.

Note that the settlement condition information is not limited to the above, and can include events that is determined in some cases after the virtual currency data is issued from the settlement device 200, for example, payment is accepted only when the weather of the day at a certain place is sunny; payment is accepted only when a specific soccer team wins a specific game; and payment is accepted only when an average stock price in a certain stock market exceeds a certain price. In such a case, the settlement device 200 may search for information necessary for determining whether the settlement condition information is satisfied from an external device via the network 400, and may supply the information to the settlement determination unit 226.

In any case, when the settlement determination unit 226 determines that the settlement condition information (all of them in a plurality of cases) is satisfied, the settlement determination unit 226 generates final determination data indicating positive information that payment of the amount of money specified by the amount information is accepted. When the settlement condition information is information for changing the amount of money specified by the amount information, the payment amount to be accepted is the amount of money after the change.

On the other hand, in cases where: the settlement determination unit 226 receives, from the decryption unit 225, the information indicating that the decryption of the virtual currency encryption data cannot be performed; the determination is not performed that the virtual currency encryption data is authentic; and the settlement determination unit 226 is not determined that settlement condition information (all of them in a plurality of cases) is satisfied, the settlement determination unit 226 generates final determination data indicating negative information that payment of the amount of money specified by the amount information is not accepted.

In any case, the generated final determination data is sent from the settlement determination unit 226 to the main control unit 222.

The main control unit 222 receives the final determination data and performs the following processing.

When the final determination data is positive, the main control unit 222 executes a process of paying the amount of money specified by the final determination data to the administrator of the settlement terminal 300. The settlement processing is a process of accepting the payment of the money to the settlement terminal 300 that has sent the virtual currency encryption data. In this embodiment, the main control unit 222 retains data indicating what kind of settlement has been made. For example, the main control unit 222 is configured to cause a recording medium (not shown) for each settlement terminal 300 to record information indicating how much payment is finally permitted to who (administrator or the like of which settlement terminal 300). These data is sent, for example, to the bank where the bank account specified by the administrator of the settlement terminal 300 exists, and as a result, payment is made to the administrator of the settlement terminal 300 from, for example, the administrator (or, from the bank account or the like specified by the user using the virtual currency data) of the settlement device 200.

When the final determination data is positive, the main control unit 222 generates positive determination result data that is data including at least information on the fact that payment has been made and the amount of money.

On the other hand, when the final determination data is negative, the main control unit 222 does not perform the settlement processing. Further, the main control unit 222 generates negative determination result data that is data including at least information that payment has not been made.

In any case, the determination result data is sent from the main control unit 222 to the transmission and reception unit via the data input/output unit 221 and is transmitted to the settlement terminal 300 via the network 400 (S928).

The determination result data is received by the transmission and reception unit of the settlement terminal 300 (S933).

The determination result data received by the transmission and reception unit is sent to the main control unit 321 as in the previous cases.

The main control unit 321 instructs the display control unit 322 to display on the display according to the determination result data. As a result, the display control unit 322 causes the display to display according to the determination result data (S934). Although not shown, the display will include, for example, the fact that the payment is accepted and the amount of money in the case where the determination result data is positive, and include the fact that the settlement is not accepted in the case where the determination result data is negative. In the latter case, the determination result data includes the information for specifying the reason why the settlement is not accepted, and thus the reason why the settlement is not accepted is desirably displayed on the display.

The determination result data can also be transmitted to the user terminal 100, and the image based on the determination result data can be displayed on the display 101 even in the user terminal 100.

Thus, the payment processing using the virtual currency data from the user to the administrator of the settlement terminal 300 is completed.

In the above description, the recipient of payment due to the virtual currency data using a certain user terminal 100 is only the administrator or the like of the settlement terminal 300. However, a recipient of payment due to the virtual currency data using a certain user terminal 100 can be a user of another user terminal 100.

In this case, the user terminal 100 owned by the user who receives the payment may have the same functional blocks as those of the settlement terminal 300 by installing the same computer program as that installed in the settlement terminal 300. This is possible when the user terminal 100 is a smartphone including a computer. In addition, although the settlement terminal 300 is equipped with the camera as hardware, the user terminal 100 has a camera in common sense when being a smartphone, and thus the user terminal 100 also satisfies the conditions. In this case, the basic data recording unit 224 of the settlement device 200 will be required to be recorded with the data, which are equivalent to various data recorded in association with the settlement terminal ID of each settlement terminal 300, in association with the user ID of each user terminal 100 within a range necessary for the settlement determination unit 226 to determine satisfiability of the settlement condition information when the settlement determination unit 226 determines whether the payment to each user can be performed.

In this embodiment, the virtual currency data is delivered from the user terminal 100 to the settlement terminal 300 without using the network 400. However, regardless of whether such a delivery is a delivery of the virtual currency data from the user terminal 100 to the settlement terminal 300 or a delivery of the virtual currency data between the user terminals 100, such a delivery may be realized by transmission/reception of the virtual currency data via the network 400 (in some cases, transmission/reception via the settlement device 200 to prevent double transfer of the virtual currency data).

In this embodiment, the settlement device 200 has both the function of issuing the virtual currency data and sending it to the outside and the function of receiving the virtual currency data and determining whether the settlement is permitted, but a virtual currency data issuing device and a virtual currency data settlement device can also be separated from each other, which have these functions, respectively.

In this case, both the former and the latter can be the same as the settlement device 200 already described as the hardware configuration; and regarding the functional block, the former may have a functional block having a function necessary until the virtual currency data is sent to the user terminal 100, and the latter may have a functional block having a function necessary after that.

Modification Example 1

A settlement system according to Modification Example 1 is almost the same as the settlement system according to the first embodiment. In particular, the configuration of the user terminal 100 and the settlement terminal 300 and the process executed therein are no different from those in the first embodiment. Furthermore, the data structure of the virtual currency data is the same as that in the first embodiment.

The configuration of the settlement device 200 and the process executed therein are different from those in the first embodiment. Nevertheless, the configuration of the settlement device 200 according to Modification Example 1 and the process executed therein are mostly the same as those in the first embodiment.

In the settlement system of the first embodiment, the encryption method used by the encryption unit 223A to generate the virtual currency encryption data included in each of the multiple virtual currency data is identically applied to all the cases of generating the virtual currency encryption data. On the other hand, in this modification example, a plurality of encryption methods are executed to obtain virtual currency encryption data.

Then, if the decryption unit 225 cannot known which of the plurality of encryption methods is used to encrypt the virtual currency encryption data when trying to decrypt a certain virtual currency encryption data, the decryption unit cannot perform the decryption processing. What makes this problem possible is the difference between the settlement device 200 of Modification Example 1 and the settlement device 200 of the first embodiment.

In this embodiment, the encryption performed by the encryption unit 223A is different for each virtual currency encryption data, but is not limited thereto. Therefore, the decryption processing performed for each virtual currency encryption data by the decryption unit 225 is also different. There are three types of methods for changing the encryption and decryption methods: changing an algorithm, changing a key, and changing both of the algorithm and the key. All of three types can be adopted, but the method for changing the key is adopted in this embodiment.

Figure 15:
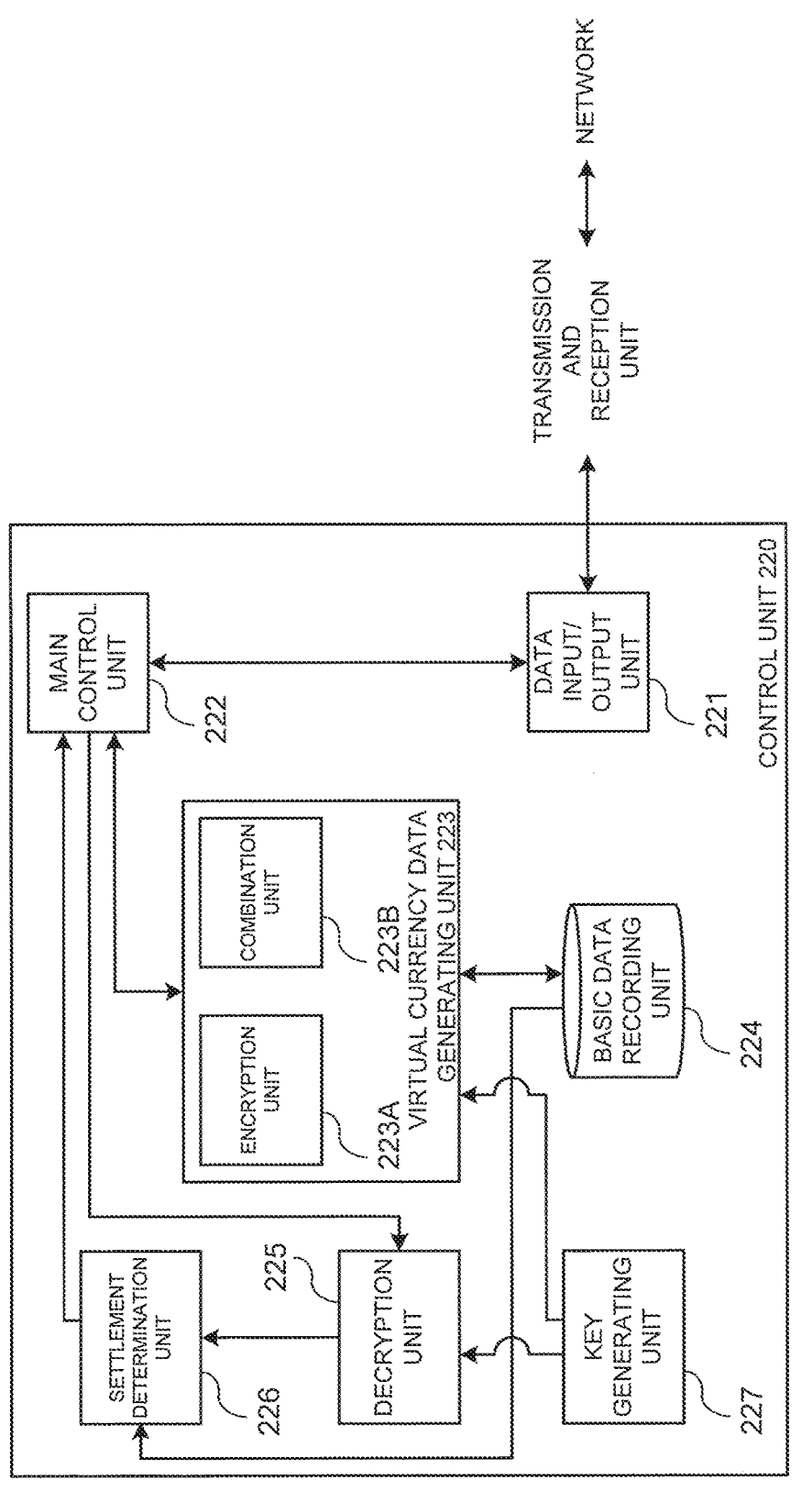
FIG. 15 is a block diagram showing functional blocks generated inside a settlement device included in a settlement system of Modification Example 1.

Even in the settlement device 200 of Modification Example 1, as described in the first embodiment, a control unit 220 serving as a functional block is generated therein by execution of a computer program. As shown in FIG. 15, functional blocks generated in the control unit 220 in Modification Example 1 are substantially the same as those in the first embodiment, and the functions carried out by the same functional blocks are the same as those in the first embodiment except for the encryption unit 223A and the decryption unit 225. The functional blocks generated in the control unit 200 in Modification Example 1 include a key generating unit 227, which is different from the first embodiment.

The key generating unit 227 generates a key used for encryption or decryption, and provides the key to the encryption unit 223A and the decryption unit 225. A method of generating the key and a timing for providing the key to the encryption unit 223A and the decryption unit 225 will be described.

A timing at which the key generating unit 227 supplies the key to the encryption unit 223A is a timing at which the encryption unit 223A performs the encryption processing. As described above, when the data shown in FIG. 12(A), that is, the plaintext data including the issuer information, the amount information, and the settlement condition information is generated, the encryption unit 223A transmits data for requesting the key generating unit 227 to generate a key. Upon receiving the data, the key generating unit 227 generates a key and sends data of the generated key to the encryption unit 223A. The encryption unit 223A obtains virtual currency encryption data by encrypting the data shown in FIG. 12(A) using an invariant algorithm and the provided key.

For example, the key generating unit 227 generates a key as follows. The key is generated as a "solution" in the following description, and is generated as an enumeration of at least one of alphabetic characters, numbers, and symbols. The solution can be, for example, a pseudo-random number sequence which is always the same under a certain condition and has initial value dependency. An example of the solution is a publicly known and well-known one-time password generation method in which one-time passwords are continuously generated from a certain initial value.

In order to generate the solution in this embodiment, a method of substituting a past solution into a predetermined function using a certain initial value (which may be two or more initial values) and thereby sequentially creating a new solution may be executed each time the solution is required. Thereby, the solution, which is the above "value", can be continuously generated. Such a solution becomes a pseudo-random number having initial value dependency.

Examples of the function used for creating the above-described "solution" include the following (a) to (c). Each of the following (a) to (c) is an expression for creating $X_N$ that is the N-th "solution". Moreover, P, Q, R, and S are natural numbers.

$$\text{(a) } (X_N) = (X_{N-1})^P + (X_{N-2})^Q$$
$$\text{(b) } (X_N) = (X_{N-1})^P$$
$$\text{(c) } (X_N) = (X_{N-1})^P (X_{N-2})^Q (X_{N-3})^R (X_{N-4})^S$$

The expression (a) generates a new "solution" using past two "solutions" to add them raised to the P-th power and the Q-th power, respectively. It should be noted that, precisely, when the past two "values" are used and the values raised to the P-th power and the Q-th power are added, the number of digits increases, and thus the new "solution" is actually generated by extracting the appropriate number of digits from the beginning of an obtained value, extracting the appropriate number of digits from the end of the value, or extracting the appropriate number of digits from an appropriate portion of the value or the like.

The expression (b) has a new "solution" using one past "solution" to arrange the number of digits of the value raised to the P-th power as described above.

The expression (c) has a new "solution" using four past "solutions" to take the product of them raised to the P-th power, the Q-th power, the R-th power, and the S-th power, respectively, and then arranging the number of digits as described above.

The above-described (a) to (c) are an example of an algorithm for generating the solution, and a change can be added to the algorithm when the solution is generated, for example, a change can also be added in which the above-described (a) to (c) are used in rotation or the like.

If the solution is generated by such a method, a first solution generated based on a certain initial value is always the same, a second solution generated is also always the same, and similarly an N-th solution generated is also always the same. This is the initial value dependency.

Using the solution generated as described above as a key, the encryption unit 223A encrypts the data shown in FIG. 12(A), and generates virtual currency encryption data. As in the case of the first embodiment, a combination unit 232B adds several plaintext data to the virtual currency encryption data, and thus virtual currency data is generated.

Such virtual currency data is sent from the settlement device 200 to the user terminal 100 as in the case of the first embodiment.

A method of using the virtual currency data is the same as in the first embodiment. The virtual currency data is delivered from the user terminal 100 to the settlement terminal 300 and is sent from the settlement terminal 300 to the settlement device 200 together with a settlement terminal ID.

The virtual currency data is sent from the main control unit 222 to the decryption unit 225 together with the settlement terminal ID as in the case of the first embodiment.

Here, as in the case of the first embodiment, the decryption unit 225 decrypts virtual currency encryption data. However, for this purpose, the decryption unit 225 needs to obtain the key used when the encryption unit 223A encrypts the virtual currency encryption data. Therefore, the decryption unit 225, which has received the virtual currency data, sends data for requesting the key generating unit 227 to generate key data. Then, the decryption unit 225 attaches serial number information, which is included in the virtual currency data in a plaintext state, to the data.

As described above, the serial number information of this embodiment is a serial number of a multi-digit number starting from 1 represented in hexadecimal notation. In other words, the number specified by such serial number information indicates what number key is generated to be used in a case of encrypting the virtual currency encryption data to be decrypted. Therefore, the key generating unit 227 continuously performs arithmetic operations to obtain the number-th solution specified by the serial number information using mathematical expressions (a) to (c). As a result, the key generating unit 227 can generate the same solution as the key used in a case of encrypting the virtual currency encryption data to which the serial number information is attached. Then, the key generating unit 227 sends the key, which is the generated solution, to the decryption unit 225.

Thus, the decryption unit 225 can perform the decryption processing using the key used when the encryption unit 223A encrypts the virtual currency encryption data. That is, in Modification Example 1, the serial number information also serves as the encryption condition information as referred to in the present invention.

Note that the encryption condition information included in the virtual currency data may be in plaintext, or may be in an encrypted state. However, in a case of encryption of the encryption condition information, the encryption method is identically applied to the encryption condition information included all of the virtual currency data in practice. The reason is because, if the encryption condition information included in each virtual currency data is encrypted by different methods (for example, different keys), a decryption condition (encryption condition when the encrypted encryption condition information is encrypted) is required in a case of decrypting each type of encryption condition information. In the settlement device 200, although not limited to this, the main control unit 222 encrypts the encryption condition information when the virtual currency data is generated and issued, and the main control unit 222 decrypts the encryption condition information when the settlement is performed. When the encryption method and the decryption method are the same, it is naturally possible for the same main control unit 222 to perform the encryption and the decryption. In Modification Example 1, the serial number information also serves as the encryption condition information, and when the serial number information is necessary to be kept in plaintext, it is necessary to prepare encryption condition information other than the serial number information as will be described below. Then, it is possible to keep the serial number information included in the virtual currency data in plaintext and to encrypt the encryption condition information included in the virtual currency data.

Subsequent processes are the same as those in the first embodiment.

In Modification Example 1, the serial number information is used as the encryption condition information as referred to in the present invention. That is, the serial number information, which is a part of the issuer information, is also used as the encryption condition information.

Alternatively, for example, the serial number information is not used as the encryption condition information (in this case, the serial number information need not be a serial number), and information different from the serial number information can be included in the virtual currency data in a plaintext state or in an encrypted state. The data is data serial number data indicating what number key is generated by the key generating unit 227 to be used when the virtual currency encryption data is generated.

In addition, the combination unit 223B adds the key itself used when the encryption unit 223A performs the encryption processing to the virtual currency encryption data encrypted by the key, and thus the encryption condition information can also be included in the virtual currency data. Since such virtual currency data is attached with a key that can be used to decrypt the virtual currency encryption data included in the virtual currency data, there is a risk that the virtual currency encryption data is decrypted by a malicious third party. However, unless the algorithm used for encryption and decryption is known to the third party, the malicious third party cannot decrypt the virtual currency encryption data, and thus tentative safety can be maintained. When the encryption condition information is the key itself, the decryption unit 225 can perform decryption using the key, and thus the decryption unit 225 needs not to receive the key from the key generating unit 227 when performing the decryption processing.

Note that the encryption condition information does not depend on the above description. For example, the solution is determined by the date and time when the above-described solution is generated. In other words, when the key generating unit 227 uses an algorithm, which can always reproduce the solution later if a certain date is specified, to generate the solution, the encryption condition information can be information for specifying the date and time when the solution used by the encryption unit 223A is generated by the key generating unit 227. When the decryption unit 225 notifies the key generating unit 227 of the date and time, the key generating unit 227 can generate the same solution as the key used for the encryption by the encryption unit 223A, and thus the decryption unit 225 receives the same key as the key used for the encryption by the encryption unit 223A, from the key generating unit 227.

Second Embodiment

A settlement system according to a second embodiment is almost the same as the settlement system according to the first embodiment. In particular, configurations of the user terminal 100 and the settlement terminal 300 and processes executed by it are no different from those in the first embodiment. Further, a data structure of virtual currency data is also basically the same as that in the first embodiment. The virtual currency data used in the settlement system according to the second embodiment also includes virtual currency encryption data, which is encrypted data, as in the case of the first embodiment, but, as will be described below, encryption processing performed on the virtual currency encryption data need not to include decryption, unlike the case of the first embodiment. For example, the encryption processing performed on the data shown in FIG. 12(A) to obtain virtual currency encryption data can be conversion such as taking a hash value.

The difference between the second embodiment and the first embodiment is a configuration of the settlement device 200 and a process executed by it. Nevertheless, the configuration of the settlement device 200 according to the second embodiment and the process executed by it are mostly the same as those in the case of the first embodiment.

Figure 16:
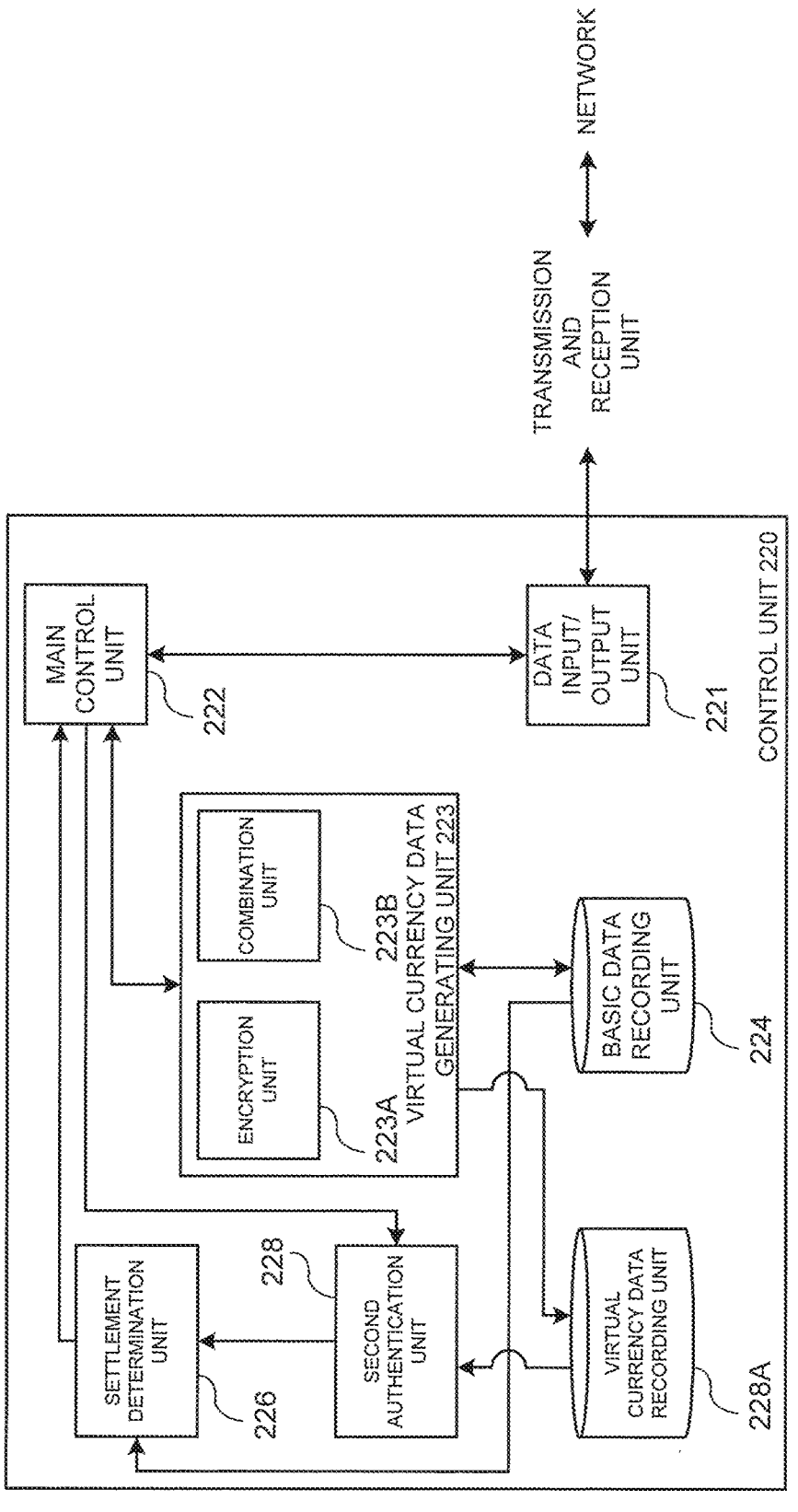
FIG. 16 is a block diagram showing functional blocks generated inside a settlement device included in a settlement system of a second embodiment.

Even in the settlement device 200 according to the second embodiment, as described in the first embodiment, a control unit 220 serving as a functional block is generated therein by execution of a computer program. As shown in FIG. 16, functional blocks generated in the control unit 200 of the second embodiment are substantially the same as those in the first embodiment, and the functions carried out by the same functional blocks are the same as those in the first embodiment except for some functions of the virtual currency data generating unit 223. In addition, the functional blocks generated in the control unit 200 in the second embodiment include a second authentication unit 228 and a virtual currency data recording unit 228A that are not included in the first embodiment, instead of the decryption unit 225 that is included in the first embodiment. This is a main difference between the first embodiment and the second embodiment.

The description will be made with respect to functions of the virtual currency data generating unit 223, the second authentication unit 228, and the virtual currency data recording unit 228A in the settlement device 200 of the second embodiment and processes executed by the former two units.

First, the description will be made with respect to the virtual currency data generating unit 223. The function of the virtual currency data generating unit 223 of the second embodiment and the process executed performed by it are almost the same as those in the first embodiment. The virtual currency data generating unit 223 includes an encryption unit 223A and a combination unit 223B as in the case of the first embodiment. The function of the combination unit 223B and the process performed by it are the same as those in the first embodiment.

The function of the encryption unit 223A of the second embodiment and the process performed by it are basically the same as those in the first embodiment, but the encryption processing performed by the encryption unit 223A of the second embodiment may include decryption later, or may not include decryption.

As in the case of the first embodiment, the encryption unit 223A encrypts the data shown in FIG. 12(A) to generate virtual currency encryption data. As in the case of the first embodiment, such virtual currency encryption data is sent to the combination unit 223B, the combination unit 223B adds the plaintext data described in the first embodiment to the virtual currency encryption data, and thus virtual currency data is generated. The virtual currency data generating unit 223 of the first embodiment sends the virtual currency data to the main control unit 222 in order for the settlement device 200 to perform a process of sending the virtual currency data from the settlement device 200 to the user terminal 100, but the virtual currency data generating unit 223 of the second embodiment is configured to send the virtual currency data to the virtual currency data recording unit 228A as well as the main control unit 222. In this embodiment, the virtual currency data generating unit 223 sends not only the virtual currency data but also plaintext issuer information, plaintext amount information, and plaintext settlement condition information which are data shown in FIG. 12(A) and serving as the origin of the virtual currency encryption data included in the virtual currency data, to the virtual currency data recording unit 228A.

The received virtual currency data is recorded in the virtual currency data recording unit 228A in association with the received plaintext issuer information, amount information, and settlement condition information which serve as the origin of the virtual currency encryption data included in the virtual currency data. Since such a process is repeatedly performed, the virtual currency data recording unit 228A is typically recorded with a plurality of sets of data formed by, in pairs, the virtual currency data with the plaintext issuer information, amount information, and settlement condition information which serve as the origin of the virtual currency encryption data included in the virtual currency data.

The virtual currency data sent to the main control unit 222 is sent from the settlement device 200 to the user terminal 100 as in the case of the first embodiment.

A method of using such virtual currency data is the same as that in the first embodiment, and the virtual currency data is delivered from the user terminal 100 to the settlement terminal 300 and is sent from the settlement terminal 300 to the settlement device 200 together with a settlement terminal ID.

The virtual currency data is sent from the main control unit 222 to the second authentication unit 228 together with the settlement terminal ID as in the case of the first embodiment.

The second authentication unit 228 has a function of confirming whether the received virtual currency data is authentic, or more specifically, whether the virtual currency encryption data included in the received virtual currency data is authentic. This confirmation is actually performed, in the first embodiment, by the fact that the virtual currency encryption data can be decrypted by the decryption unit 225, but the second authentication unit 228 performs the confirmation with a different method.

The second authentication unit 228, which has received the virtual currency data from the main control unit 222, searches for the data recorded in the virtual currency data recording unit 228A, determines that the virtual currency encryption data received from the main control unit 222 is authentic when the same virtual currency data as the virtual currency data received from the main control unit 222 is recorded in the virtual currency data recording unit 228A, and determines that the virtual currency encryption data received from the main control unit 222 is not authentic when the same virtual currency data as the virtual currency data received from the main control unit 222 is not recorded in the virtual currency data recording unit 228A. In a case of using such a determination method, it is preferable to perform an appropriate way, for example, to increase the number of characters (the number of digits) of the virtual currency data so as to avoid duplication in a large number of pieces of virtual currency data generated by a large number of requests from a large number of user terminals 100. Out of the virtual currency data recorded in the virtual currency data recording unit 228A, the data read from the second authentication unit 228 is preferably erased from the virtual currency data recording unit 228A after the payment to the administrator of the settlement terminal 300 using the corresponding virtual currency data is completed, for example.

When determining that the virtual currency data received from the main control unit 222 is authentic, the second authentication unit 228 reads the issuer information, the amount information, and the settlement condition information which are recorded in the virtual currency data recording unit 228A in a state of being associated with the same virtual currency data as the virtual currency data received from the main control unit 222. In this state, the second authentication unit 228 has the issuer information, the amount information, and the settlement condition information. These types of the issuer information, the amount information, and the settlement condition information are data serving as the origin of the virtual currency encryption data when the second authentication unit 228 encrypts the virtual currency encryption data included in the virtual currency data received from the main control unit 222. That is, the state in which the second authentication unit 228 has the issuer information, the amount information, and settlement conditions is the same as the state in which the decryption unit 225 decrypts the virtual currency encryption data included in the virtual currency data received from the main control unit 222 in the first embodiment.

That is, all subsequent processes can be made the same as those in the first embodiment, and thus these processes are applied to the second embodiment. According to the first embodiment, the decryption unit 225 sends the issuer information, the plaintext amount information, and the plaintext settlement condition information that are all returned to plaintext to the settlement determination unit 226 together with the data of the settlement terminal ID, but according to the second embodiment, the second authentication unit 228 sends all of the plaintext issuer information, the plaintext amount information, and the plaintext settlement condition information to the settlement determination unit 226 together with the data of the settlement terminal ID. On the other hand, according to the first embodiment, when the virtual currency encryption data cannot be decrypted, the information indicating the purport thereof is sent from the decryption unit 225 to the settlement determination unit 226, but according to the second embodiment, when the same virtual currency data as the virtual currency data sent from the main control unit 222 to the second authentication unit 228 does not exist in the virtual currency data recording unit 228A, the information, which has the same meaning as the information indicating that the decryption cannot be performed in the first embodiment and indicates that the same virtual currency data does not exist in the virtual currency data recording unit 228A, is sent to the settlement determination unit 226.

The subsequent description will not be made.

In the description of the second embodiment, the second authentication unit 228 determines the authenticity of the virtual currency encryption data out of the virtual currency data sent from the main control unit 222 depending on whether the same virtual currency data as the virtual currency data sent from the main control unit 222 exists in the virtual currency data recording unit 228A.

However, such a determination can be made only with respect to the virtual currency encryption data without depending on the entire virtual currency data. Therefore, the main control unit 222 may send only the virtual currency encryption data instead of the entire virtual currency data to the second authentication unit 228 together with the settlement terminal ID. In this case, the virtual currency data generating unit 223 records the virtual currency encryption data instead of the virtual currency data in the virtual currency data recording unit 228A in association with the plaintext issuer information, the plaintext amount information, and the plaintext settlement condition information. Then, the second authentication unit 228 determines the authenticity of the virtual currency encryption data out of the virtual currency data sent from the main control unit 222 depending on whether the same virtual currency encryption data as the virtual currency encryption data sent from the main control unit 222 exists in the virtual currency data recording unit 228A.

Third Embodiment

A settlement system according to a third embodiment is almost the same as the settlement system according to the first embodiment. In particular, configurations of the user terminal 100 and the settlement terminal 300 and processes executed by it are no different from those in the first embodiment. Further, a data structure of virtual currency data is also basically the same as that in the first embodiment. The virtual currency data used in the settlement system according to the third embodiment also includes virtual currency encryption data, which is encrypted data, as in the case of the first embodiment, but, as will be described below, encryption processing performed on the virtual currency encryption data need not to include decryption, unlike the case of the first embodiment. For example, the encryption processing performed on the data shown in FIG. 12(A) to obtain virtual currency encryption data can be conversion such as taking a hash value as in the case of the second embodiment.

The difference between the third embodiment and the first embodiment is a configuration of the settlement device 200 and a process executed by it. Nevertheless, the configuration of the settlement device 200 according to the third embodiment and the process executed by it are mostly the same as those in the case of the first embodiment.

Figure 17:
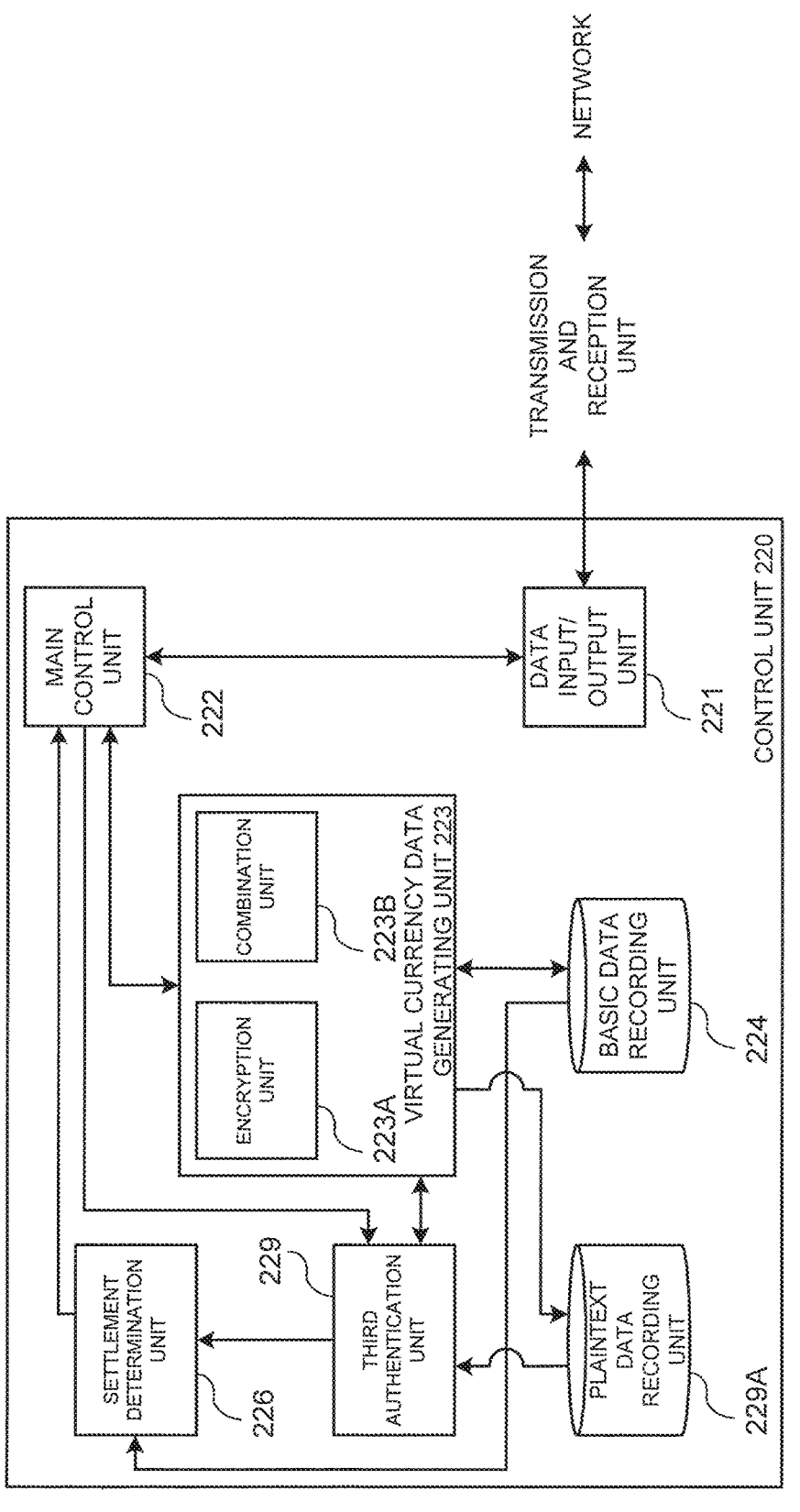
FIG. 17 is a block diagram showing functional blocks generated inside a settlement device included in a settlement system of a third embodiment.

Even in the settlement device 200 according to the third embodiment, as described in the first embodiment, a control unit 220 serving as a functional block is generated therein by execution of a computer program. As shown in FIG. 17, functional blocks generated in the control unit 200 of the third embodiment are substantially the same as those in the first embodiment, and the functions carried out by the same functional blocks are the same as those in the first embodiment except for some functions of the virtual currency data generating unit 223. In addition, the functional blocks generated in the control unit 200 in the third embodiment include a third authentication unit 229 and a plaintext data recording unit 229A that are not included in the first embodiment, instead of the decryption unit 225 that is included in the first embodiment.

The description will be made with respect to functions of the virtual currency data generating unit 223, the third authentication unit 229, and the plaintext data recording unit 229A in the settlement device 200 of the third embodiment and processes executed by the former two units.

First, the description will be made with respect to the virtual currency data generating unit 223. The function of the virtual currency data generating unit 223 of the third embodiment and the process executed performed by it are almost the same as those in the first embodiment. The virtual currency data generating unit 223 includes an encryption unit 223A and a combination unit 223B as in the case of the first embodiment. The function of the combination unit 223B and the process performed by it are the same as those in the first embodiment.

In the first embodiment, the virtual currency data generating unit 223 first generates the data which has the data structure as shown in FIG. 12(A) and includes the issuer information, the amount information, and the settlement condition information. As in the first embodiment, such data is encrypted by the encryption unit 223A and converted into virtual currency encryption data. The function of the encryption unit 223A of the third embodiment and the process performed by it are basically the same as those in the first embodiment, but the encryption processing performed by the encryption unit 223A of the third embodiment may include decryption later, or may not include decryption. As in the case of the first embodiment, the virtual currency encryption data is sent to the combination unit 223B, the combination unit 223B adds the plaintext data described in the first embodiment to the virtual currency encryption data, and thus virtual currency data is generated. The virtual currency data generating unit 223 of the first embodiment sends the virtual currency data to the main control unit 222 in order for the settlement device 200 to perform a process of sending the virtual currency data from the settlement device 200 to the user terminal 100, but the same applies to third embodiment.

On the other hand, according to the third embodiment, the data shown in FIG. 12(A) is sent from the virtual currency data generating unit 223 to the plaintext data recording unit 229A and recorded in the plaintext data recording unit 229A. Since such a process is repeatedly performed, the plaintext data recording unit 229A is typically recorded with a large number of pieces of data formed by the issuer information, the amount information, and the settlement condition information which are associated with each other.

The virtual currency data sent to the main control unit 222 is sent from the settlement device 200 to the user terminal 100 as in the case of the first embodiment.

A method of using such virtual currency data is the same as that in the first embodiment, and the virtual currency data is delivered from the user terminal 100 to the settlement terminal 300 and is sent from the settlement terminal 300 to the settlement device 200 together with a settlement terminal ID.

The virtual currency data is sent from the main control unit 222 to the third authentication unit 229 together with the settlement terminal ID as in the case of the first embodiment.

The third authentication unit 229 has a function of confirming whether the received virtual currency data is authentic, or more specifically, whether the virtual currency encryption data included in the received virtual currency data is authentic. This confirmation is actually performed, in the first embodiment, by the fact that the virtual currency encryption data can be decrypted by the decryption unit 225, but the third authentication unit 229 performs the confirmation with a different method.

The third authentication unit 229, which has received the virtual currency data from the main control unit 222, first extracts the serial number information included in the virtual currency data in a form of plaintext. Then, when the issuer information including the serial number information is searched from the data recorded in the plaintext data recording unit 229A and such issuer information is found, the issuer information and the amount information and the settlement condition information associated with the issuer information are read from the plaintext data recording unit 229A.

When the serial number information included in the virtual currency data received from the main control unit 222 cannot be found from the data recorded in the plaintext data recording unit 229A, the main control unit 222 does not perform reading of the issuer information and the like.

When the issuer information and the like are read, the third authentication unit 229 sends the plaintext issuer information, amount information, and settlement condition information read from the plaintext data recording unit 229A, to the virtual currency data generating unit 223, and requests the encryption unit 223A to encrypt these types of information. The encryption unit 223A encrypts the requested information and converts it into virtual currency encryption data. The virtual currency encryption data newly created by the virtual currency data generating unit 223 is sent from the virtual currency data generating unit 223 to the third authentication unit 229.

Then, the third authentication unit 229 compares the virtual currency encryption data included in the virtual currency data sent from the main control unit 222 with the virtual currency encryption data newly created by the virtual currency data generating unit 223 in response to the request of the third authentication unit 229. The third authentication unit 229 determines that the virtual currency encryption data received from the main control unit 222 is authentic when both data coincide with each other as a result of comparison, and determines that the virtual currency encryption data received from the main control unit 222 is not authentic when both data do not coincide with each other. Even when the serial number information included in the virtual currency data received from the main control unit 222 is not found from the data recorded in the plaintext data recording unit 229A, the third authentication unit 229 determines that the virtual currency encryption data received from the main control unit 222 is not authentic. As in the case of the first embodiment, the encryption of the encryption unit 223A is always performed by the same method in the third embodiment. If there no falsification of the virtual currency encryption data, which is sent from the main control unit 222, by a malicious third party, since the virtual currency encryption data included in the virtual currency data sent from the main control unit 222 coincides with the virtual currency encryption data newly created by the virtual currency data generating unit 223 in response to the request of the third authentication unit 229, the authenticity of the virtual currency encryption data included in the virtual currency data sent from the main control unit 222 can be determined depending on whether the two pieces of virtual currency encryption data coincide with each other. In the case of such a determination, out of the issuer information, the amount information, the settlement condition information associated with each other and recorded in the plaintext data recording unit 229A, the information read from the third authentication unit 229 is preferably erased from the plaintext data recording unit 229A after the payment to the administrator or the like of the settlement terminal 300 using the corresponding virtual currency data is completed, for example.

When the third authentication unit 229 determines that the virtual currency data received from the main control unit 222 is authentic, the third authentication unit 229 is in a state of having the issuer information, the amount information, and the settlement condition information which are read from the plaintext data recording unit 229A and associated with each other. These types of the issuer information, the amount information, and the settlement condition information are data serving as the origin of the virtual currency encryption data when the third authentication unit 229 encrypts the virtual currency encryption data included in the virtual currency data received from the main control unit 222. That is, the state in which the third authentication unit 229 has the issuer information, the amount information, and settlement conditions is the same as the state in which the decryption unit 225 decrypts the virtual currency encryption data included in the virtual currency data received from the main control unit 222 in the first embodiment.

That is, as in the case of the second embodiment, all subsequent processes can be made the same as those in the first embodiment, and thus these processes are applied to the third embodiment. As in the case of the first embodiment, according to the third embodiment, the third authentication unit 229 sends all of the plaintext issuer information, the plaintext amount information, and the plaintext settlement condition information to the settlement determination unit 226 together with the data of the settlement terminal ID. On the other hand, according to the first embodiment, when the virtual currency encryption data cannot be decrypted, the information indicating the purport thereof is sent from the decryption unit 225 to the settlement determination unit 226, but according to the third embodiment, when it is determined that the virtual currency encryption data included in the virtual currency data sent from the main control unit 222 to the third authentication unit 229 is not authentic, the information, which has the same meaning as the information indicating that the decryption cannot be performed in the first embodiment and indicates the determination that the virtual currency encryption data included in the virtual currency data sent from the main control unit 222 is not authentic, is sent to the settlement determination unit 226.

The subsequent description will not be made.

In the third embodiment, the same issuer information, amount information, and settlement condition information as the issuer information, amount information, and settlement condition information serving as the origin of the virtual currency encryption data included in the virtual currency data provided to the user terminal 100 are re-encrypted, and the authenticity of the virtual currency encryption data included in the virtual currency data provided to the user terminal 100 is determined depending on whether the virtual currency encryption data obtained by re-encryption coincides with the virtual currency encryption data included in the virtual currency data provided to the user terminal 100.

In order to make this possible, the virtual currency encryption data, which is a determination target of the authenticity and included in the virtual currency data sent from the settlement terminal 300, needs to be decided from the issuer information, the amount information, and the settlement condition information that are recorded in the plaintext data recording unit 229A of the settlement terminal 300 and associated with each other. In the above example, this can be made by using the serial number information as a query, but is not necessarily realized by the serial number information. Each virtual currency data includes identification information that is obtained by encrypting a set of issuer information, amount information, and settlement condition information or respective types of information and is in one-to-one correspondence with the virtual currency encryption data included in the virtual currency data and provided to the user terminal 100, the identification information is recorded in the plaintext data recording unit 229A in association with the issuer information, the amount information, and the settlement condition information which are associated with each other, and thus such identification information can be used as a search query.

Modification Example 2

A settlement system according to Modification Example 2 is almost the same as the settlement system according to the third embodiment. The relation between the settlement system of Modification Example 2 and the settlement system of the third embodiment is the same as the relation between the settlement system of Modification Example 1 and the settlement system of the first embodiment.

In the settlement system of the first embodiment, the encryption method using the encryption unit 223A to generate the virtual currency encryption data included in each of the multiple virtual currency data is identically applied to all the cases of generating the virtual currency encryption data. On the other hand, in Modification Example 1, a plurality of encryption methods are executed to obtain virtual currency encryption data.

Similarly, in the settlement system of the third embodiment, the encryption method using the encryption unit 223A to generate the virtual currency encryption data included in each of the multiple virtual currency data is identically applied to all the cases of generating the virtual currency encryption data. On the other hand, in Modification Example 2, a plurality of encryption methods are executed to obtain virtual currency encryption data.

Figure 18:
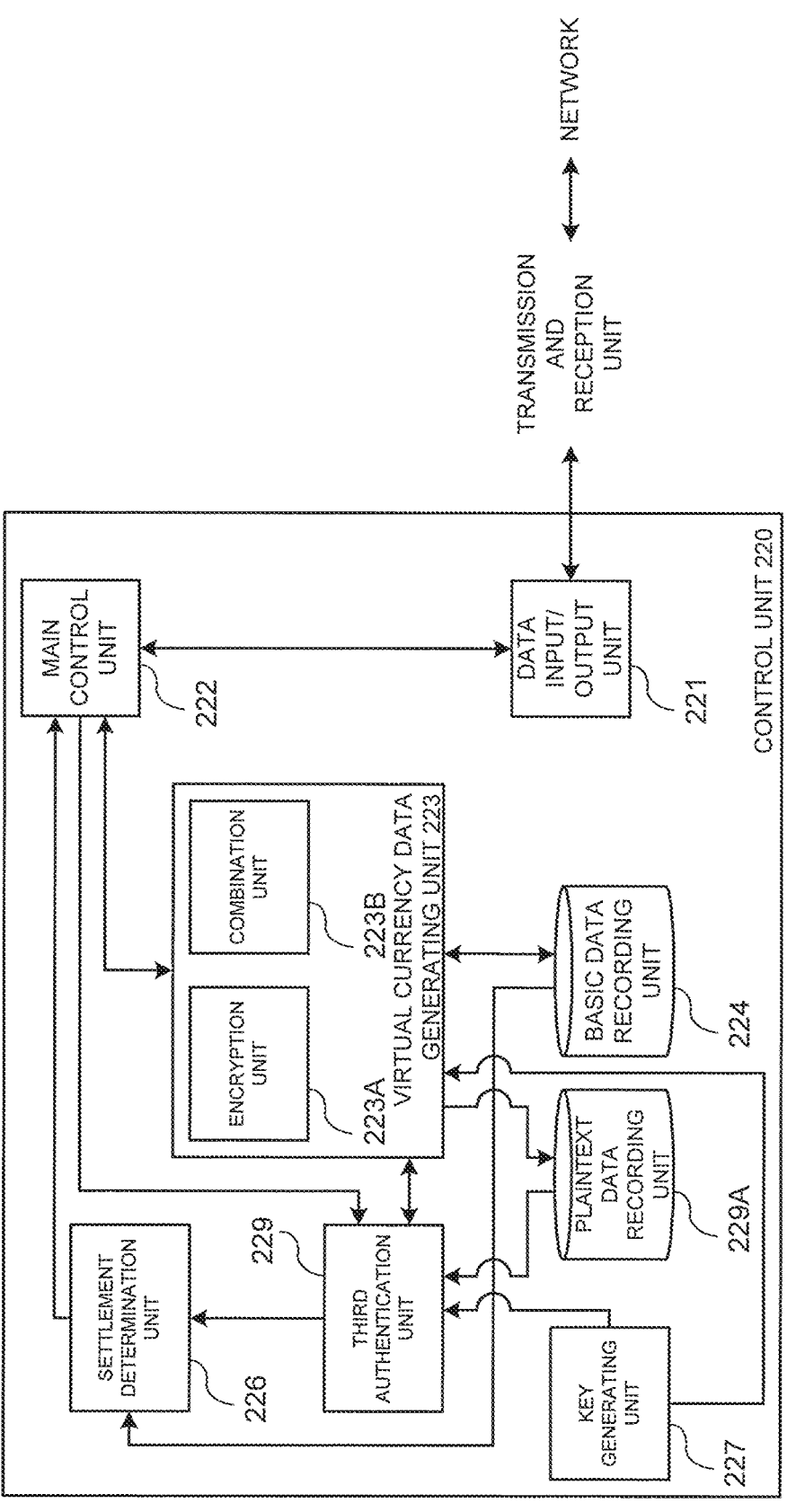
FIG. 18 is a block diagram showing a functional block generated inside a settlement device included in a settlement system of Modification Example 2.

Then, when the encryption unit 223A in Modification Example 2 performs re-encryption of the issuer information, the amount information, and the condition information recorded in the plaintext data recording unit 229A, which will be described below, as in Modification Example 1, if the encryption unit 223A cannot know which of the plurality of encryption methods is used to encrypt the virtual currency encryption data for which authenticity is to be determined by the third authentication unit 229, decryption processing cannot be performed. In order to perform the decryption processing, a key generating unit 227 is also provided in a settlement device 200 of Modification Example 2 as in the settlement device 200 of the Modification Example 1 (FIG. 18).

In Modification Example 2, the encryption unit 223A is configured to receive a key necessary for encryption from a key generating unit 227 even in a case of creating the virtual currency encryption data included in the virtual currency data provided to the user terminal 100 by encryption of the data formed by the issuer information, the amount information, and the settlement condition information shown in FIG. 12(A) and even in a case of creating the virtual currency encryption data used by the third authentication unit 229 to determine the authenticity of the virtual currency encryption data included in the virtual currency data sent from the settlement terminal 300 to the settlement device 200 by encryption of the data formed by the issuer information, the amount information, and the settlement condition information provided from the third authentication unit 229.

In order to enable the key generating unit 227 to generate the key used in both cases, for example, the serial number information may be used as the encryption condition information as in the case of Modification Example 1. Alternatively, as described in Modification Example 1, information other than the serial number information can be used as the encryption condition information. As described in Modification Example 1, the encryption condition information may also be encrypted in plaintext.

The invention claimed is:

1. A settlement device comprising:
a memory;
a network interface; and
one or more processors coupled to the network interface and the memory, and configured to:
upon request of a user, generate virtual currency data corresponding to virtual currency having a monetary value and including plaintext serial number information unique to each virtual currency data for distinguishing the virtual currency data from other virtual currency data, and virtual currency encryption data, which is generated by encrypting, using a pseudo-random number as an encryption key, issuer information including at least information on an issuer of the virtual currency data, amount information that is information for specifying the monetary value, and settlement condition information that is information on conditions for accepting payment with the virtual currency;
record the issuer information, the amount information, the settlement condition information, and the serial number information in association with each other in the memory;
transmit the virtual currency data, via the network interface to a user device of the user, wherein the user device transmits the virtual currency data to a predetermined device;
receive the virtual currency data, via the network interface from the predetermined device for requesting settlement;
compare the virtual currency encryption data which has remained encrypted from a time of its generation, extracted from the virtual currency data received to new virtual currency encryption data which is generated by encrypting the issuer information, the amount information, the settlement condition information recorded in the memory and associated with the serial number information that is the same as the serial number information extracted from virtual currency data the received, and determine that the virtual currency data sent from the predetermined device is authentic when both of the data coincide with each other;

determine whether a condition specified by the settlement condition information recorded in the memory and associated with the serial number information that is the same as the serial number information extracted from the virtual currency data received is satisfied; and
accept settlement of an amount of money specified by the amount information recorded in the memory and associated with the serial number information that is the same as the serial number information extracted from the virtual currency data received in response to the condition specified by the settlement condition information being satisfied.

2. A settlement method executed by a settlement device capable of receiving data via a network and including a recording medium and a computer for performing data processing, the settlement method includes steps executed by the computer of:
upon request of a user, generating virtual currency data corresponding to virtual currency having a monetary value and including plaintext serial number information unique to each virtual currency data for distinguishing the virtual currency data from other virtual currency data, and virtual currency encryption data, which is generated by encrypting, using a pseudo-random number as an encryption key, issuer information including at least information on an issuer of the virtual currency data, amount information that is information for specifying the monetary value, and settlement condition information that is information on conditions for accepting payment with the virtual currency;
recording the issuer information, the amount information, the settlement condition information, and the serial number information in association with each other in the recording medium;
transmitting the virtual currency data, via the network to a user device of the user, wherein the user device transmits the virtual currency data to a predetermined device;
receiving the virtual currency data, via the network from the predetermined device for requesting settlement;
comparing the virtual currency encryption data which has remained encrypted from a time of its generation, extracted from the virtual currency data received to new virtual currency encryption data which is generated by encrypting the issuer information, the amount information, the settlement condition information recorded in the memory and associated with the serial number information that is the same as the serial number information extracted from virtual currency data the received, and determine that the virtual currency data sent from the predetermined device is authentic when both of the data coincide with each other;
determining whether a condition specified by the settlement condition information recorded in the recording medium and associated with the serial number information that is the same as the serial number information extracted from the virtual currency data received is satisfied; and
accepting settlement of an amount of money specified by the amount information recorded in the recording medium and associated with the serial number information that is the same as the serial number information extracted from the virtual currency data received in response to the condition specified by the settlement condition information being satisfied.

3. One or more non-transitory computer readable storage media encoded with instructions that, when executed by a processor, cause the processor to receive data via a network and perform data processing to function as a settlement device, the instructions causing the processor to:

upon request of a user, generate virtual currency data corresponding to virtual currency having a monetary value and including plaintext serial number information unique to each virtual currency data for distinguishing the virtual currency data from other virtual currency data, and virtual currency encryption data, which is generated by encrypting, using a pseudorandom number as an encryption key, issuer information including at least information on an issuer of the virtual currency data, amount information that is information for specifying the monetary value, and settlement condition information that is information on conditions for accepting payment with the virtual currency;

record the issuer information, the amount information, the settlement condition information, and the serial number information in association with each other in memory;

transmit the virtual currency data, via the network to a user device of the user, wherein the user device transmits the virtual currency data to a predetermined device;

receive the virtual currency data, via the network from the predetermined device for requesting settlement;

compare the virtual currency encryption data which has remained encrypted from a time of its generation, extracted from the virtual currency data received to new virtual currency encryption data which is generated by encrypting the issuer information, the amount information, the settlement condition information recorded in the memory and associated with the serial number information that is the same as the serial number information extracted from virtual currency data the received, and determine that the virtual currency data sent from the predetermined device is authentic when both of the data coincide with each other;

determine whether a condition specified by the settlement condition information recorded in the memory and associated with the serial number information that is the same as the serial number information extracted from the virtual currency data received is satisfied; and accept settlement of an amount of money specified by the amount information recorded in the memory and associated with the serial number information that is the same as the serial number information extracted from the virtual currency data received in response to the condition specified by the settlement condition information being satisfied.

* * * * *